United States Patent
Pursifull et al.

(10) Patent No.: US 10,451,013 B2
(45) Date of Patent: Oct. 22, 2019

(54) METHOD FOR OPERATING A DUAL LIFT PUMP SYSTEM

(71) Applicant: Ford Global Technologies, LLC, Dearborn, MI (US)

(72) Inventors: Ross Dykstra Pursifull, Dearborn, MI (US); Joseph Lyle Thomas, Kimball, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 796 days.

(21) Appl. No.: 14/831,561

(22) Filed: Aug. 20, 2015

(65) Prior Publication Data

US 2017/0051701 A1 Feb. 23, 2017

(51) Int. Cl.
| | |
|---|---|
| *F02M 37/00* | (2006.01) |
| *F02M 37/10* | (2006.01) |
| *F02M 37/06* | (2006.01) |
| *B60W 10/10* | (2012.01) |
| *F02M 37/18* | (2006.01) |
| *F02D 41/30* | (2006.01) |
| *F02D 41/38* | (2006.01) |
| *F02D 19/06* | (2006.01) |
| *F02D 41/00* | (2006.01) |
| *F02D 33/00* | (2006.01) |

(Continued)

(52) U.S. Cl.
CPC ....... *F02M 37/0064* (2013.01); *B60K 15/061* (2013.01); *B60W 10/10* (2013.01); *F02D 19/0615* (2013.01); *F02D 19/0647* (2013.01); *F02D 33/006* (2013.01); *F02D 41/0025* (2013.01); *F02D 41/3082* (2013.01); *F02D 41/3854* (2013.01); *F02M 37/0094* (2013.01); *F02M 37/06* (2013.01); *F02M 37/10* (2013.01); *F02M 37/106* (2013.01); *F02M 37/18* (2013.01); *B60K 2015/03111* (2013.01); *B60K 2015/03243* (2013.01); *F02D 2041/389* (2013.01); *F02D 2200/0602* (2013.01); *F02D 2200/50* (2013.01); *F02D 2200/702* (2013.01); *F02D 2400/08* (2013.01); *Y02T 10/36* (2013.01)

(58) Field of Classification Search
CPC .......... B60K 2015/0777; B60W 10/10; F02D 2041/389; F02D 2200/0602; F02D 2200/50; F02D 2200/702; F02D 2400/08; F02D 33/006; F02D 41/3082; F02D 41/3854; F02M 37/0094; F02M 37/06; F02M 37/10

See application file for complete search history.

(56) References Cited

U.S. PATENT DOCUMENTS

| | | | |
|---|---|---|---|
| 4,545,343 A * | 10/1985 | Cook ................. | B60R 25/04 123/179.25 |
| 4,726,335 A * | 2/1988 | Brauninger ......... | F02D 17/04 123/179.16 |

(Continued)

*Primary Examiner* — Carl C Staubach
(74) *Attorney, Agent, or Firm* — Julia Voutyras; McCoy Russell LLP

(57) ABSTRACT

Methods and systems are described for a fuel system in an engine comprising two lift pumps. One example method comprises deactivating one of a first lift pump and a second lift pump if fuel fill level in a common reservoir decreases below a threshold fill level, wherein the first lift pump and the second lift pump are positioned in the common reservoir. By deactivating one of the two lift pumps, the two lift pumps may be protected from degradation due to fuel starvation.

15 Claims, 13 Drawing Sheets

(51) Int. Cl.
  *B60K 15/06* (2006.01)
  *B60K 15/03* (2006.01)

(56) References Cited

U.S. PATENT DOCUMENTS

| | | | | |
|---|---|---|---|---|
| 5,324,170 | A * | 6/1994 | Anastos | H02H 7/08 417/12 |
| 5,647,329 | A * | 7/1997 | Bucci | B01D 35/0273 123/509 |
| 6,588,449 | B1 * | 7/2003 | Kippe | F02M 37/103 123/509 |
| 6,907,899 | B2 | 7/2005 | Yu et al. | |
| 7,234,451 | B2 | 7/2007 | Betz, II et al. | |
| 7,500,473 | B2 * | 3/2009 | Kobayashi | F02M 37/0052 123/509 |
| 8,120,485 | B2 | 2/2012 | Yang | |
| 8,347,867 | B2 * | 1/2013 | Zumbaugh | F02D 41/221 123/512 |
| 8,903,130 | B1 | 12/2014 | Carceroni et al. | |
| 9,004,050 | B2 | 4/2015 | Pursifull | |
| 9,482,175 | B1 * | 11/2016 | Torgerud | F02D 41/3082 |
| 2004/0219029 | A1 * | 11/2004 | Kleppner | B60K 15/077 417/77 |
| 2005/0005952 | A1 * | 1/2005 | Bashark | A47L 15/0023 134/18 |
| 2005/0155582 | A1 * | 7/2005 | Schelhas | F02D 33/006 123/497 |
| 2005/0175488 | A1 * | 8/2005 | Schelhas | F02D 41/3836 417/505 |
| 2006/0065246 | A1 * | 3/2006 | Zdroik | B01D 35/0273 123/497 |
| 2008/0184971 | A1 * | 8/2008 | Lubinski | F02M 37/0058 123/511 |
| 2010/0166570 | A1 * | 7/2010 | Hampton | F04B 49/065 417/36 |
| 2010/0235029 | A1 * | 9/2010 | Becker | B60K 6/365 701/22 |
| 2011/0023830 | A1 * | 2/2011 | Haas | F02D 33/006 123/446 |
| 2011/0146627 | A1 * | 6/2011 | Oohashi | F02M 37/0029 123/497 |
| 2013/0048119 | A1 * | 2/2013 | Kim | F02M 37/0094 137/565.01 |
| 2014/0014073 | A1 * | 1/2014 | Scholz | F02M 39/005 123/495 |
| 2015/0044060 | A1 * | 2/2015 | Kochan, Jr. | F04B 49/06 417/36 |
| 2015/0059705 | A1 * | 3/2015 | Oohashi | F02M 37/0088 123/505 |
| 2016/0076666 | A1 * | 3/2016 | Milton | F16K 31/20 137/399 |
| 2016/0356237 | A1 * | 12/2016 | Pursifull | F02D 41/3082 |

* cited by examiner

*As the vehicle turns right*

*As the vehicle turns left*

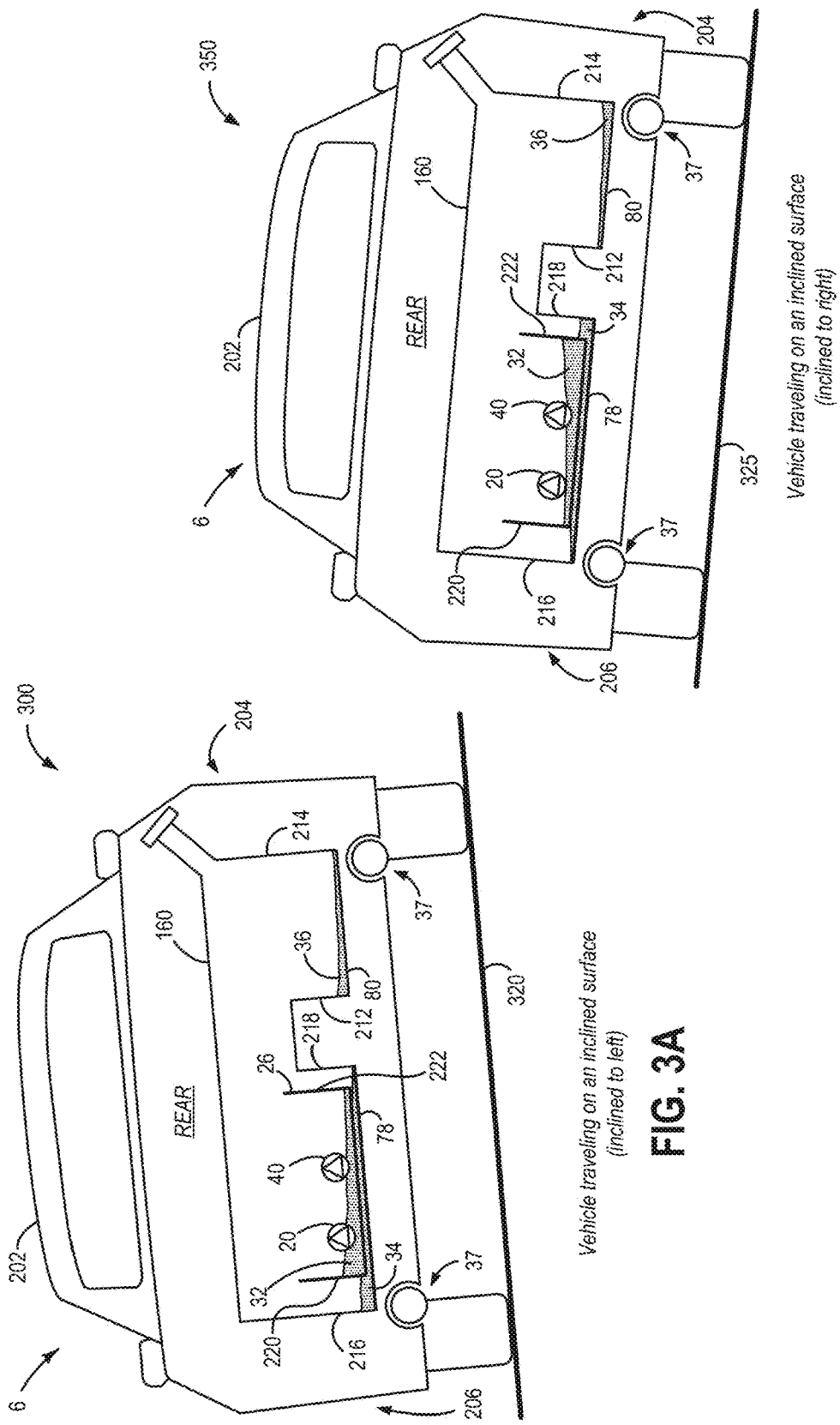

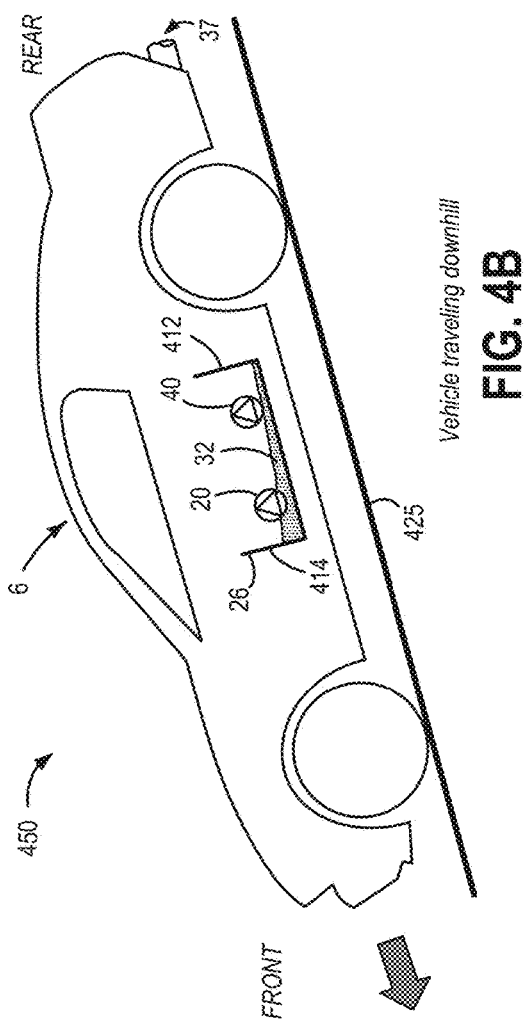
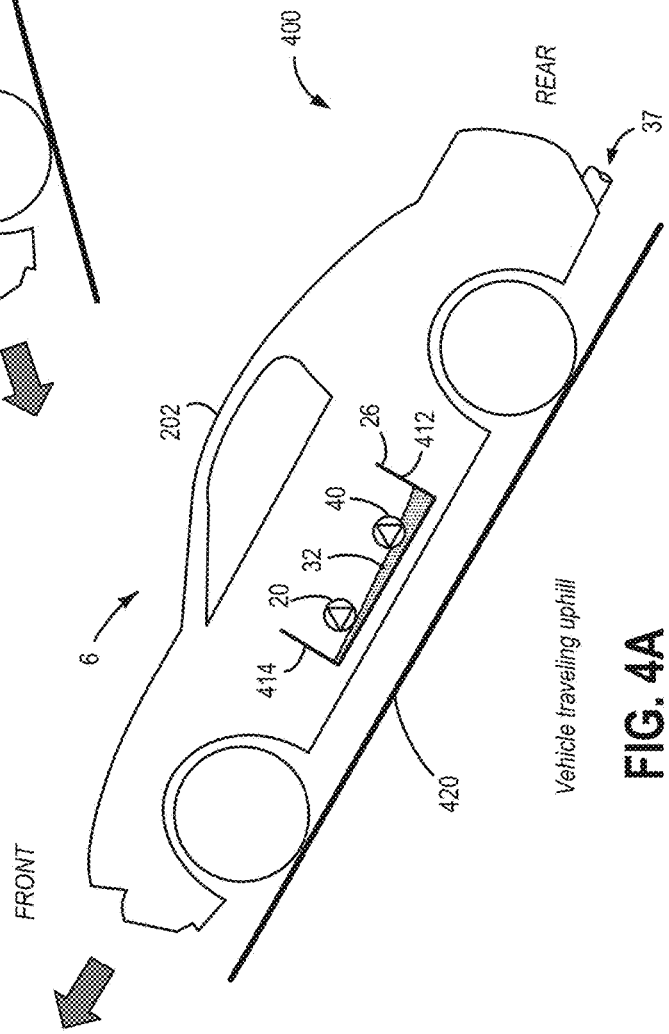
FIG. 4A
FIG. 4B

METHOD FOR OPERATING A DUAL LIFT PUMP SYSTEM

FIELD

The present description relates generally to methods for operating a fuel system including at least two lift pumps.

BACKGROUND/SUMMARY

Vehicle engine systems such as those providing higher torque may utilize gasoline direct injection (GDI) to increase power delivery and engine performance. GDI fuel injectors in these vehicle engine systems demand fuel at higher pressure for direct injection to create enhanced atomization providing more efficient combustion. In one example, a GDI system can utilize an electrically driven lower pressure pump (also termed a lift pump) and a mechanically driven higher pressure pump (also termed a direct injection fuel pump) arranged respectively in series between the fuel tank and the fuel injectors along a fuel passage. In many GDI applications the higher pressure fuel pump may be used to increase the pressure of fuel delivered to the fuel injectors.

Vehicle engine systems may encounter fuel starvation issues when the lower pressure pump in the fuel tank run dry. One example approach to mitigate fuel starvation issues in an engine in a vehicle is shown by Zumbaugh et al. in U.S. Pat. No. 8,347,867. Therein, a fuel starvation detection module is employed to detect when an output of the lower pressure pump is lower than desired based on fuel fill level, air-fuel ratio, and fuel pressure of the lower pressure pump. In response to detecting a likelihood of fuel starvation, an amount of fuel supplied by the lower pressure pump to the engine is decreased for a duration.

The inventors herein have identified potential issues with the above approach to addressing fuel starvation. For example, fuel levels at different locations within a fuel tank can vary when the vehicle rounds corners and/or travels on inclines. Thus, the lower pressure pump, based on its location within the fuel tank, may experience fuel starvation and eventual degradation even if the amount of fuel supplied by the lift pump is decreased upon determining lower fuel fill. Further, in a vehicle fuel system including a plurality of lift pumps to provide higher power, merely decreasing the amount of fuel supplied by each of the plurality of lift pumps may not be sufficient to protect the lift pumps. To elaborate, as the fuel tank is drained of fuel due to continued operation of the plurality of lift pumps, at least a subset of the plurality of lift pumps may be situated such that their fuel pickup tubes are no longer submerged in fuel. As such, this subset of the plurality of lift pumps may degrade before fuel in the fuel tank is completely exhausted.

In one example, the issues described above may be addressed by a method for a fuel system in a vehicle, comprising supplying fuel from a common reservoir via each of a first lift pump and a second lift pump, and responsive to fuel fill in the common reservoir lower than a threshold, disabling one of the first lift pump and the second lift pump, and supplying fuel only via a remaining lift pump. In this way, pump degradation may be reduced.

For example, an engine in a vehicle may be coupled to a fuel system including two lift pumps: a first lift pump and a second lift pump, wherein each of the first lift pump and the second lift pump are situated within a common reservoir in a fuel tank. The first lift pump and the second lift pump may each supply fuel to a direct injection fuel pump and the direct injection fuel pump may, in turn, deliver fuel at a higher pressure to the engine. Fuel level in the common reservoir may be monitored by a fuel level sensor. As fuel fill in the common reservoir decreases to below a threshold, one of the first lift pump and the second lift pump may be deactivated. Specifically, one of the first lift pump and the second lift pump may be shut down. However, fuel from the common reservoir may continue to be pumped to the direct injection fuel pump via a remaining pump of the first lift pump and the second lift pump. Further, a controller may select which of the two lift pumps to deactivate based on whether the vehicle is traveling on an incline and/or rounding a turn.

In this way, dual lift pumps in a fuel system may be protected from degradation as a fuel tank is drained of fuel. By deactivating one of the two lift pumps based on fuel fill level and supplying fuel to the engine with the remaining lift pump, engine operation may be continued while reducing likelihood of degradation of one of the lift pumps. Further, in the event that the fuel runs out, the remaining lift pump may cease producing fuel pressure and the engine may stall disabling the remaining lift pump. Thus, degradation of the remaining lift pump may be averted as the engine is shut down. Further still, by selecting the lift pump to deactivate based on vehicle tilt and road gradients, the remaining active lift pump may be expected to draw fuel substantially continuously during its operation. Overall, durability and life of fuel system components may be extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A and 3B schematically demonstrate the change in fuel levels within the common reservoir when the vehicle is traveling on an inclined surface.

FIGS. 4A and 4B schematically show the change in fuel levels within the common reservoir when the vehicle is traveling either uphill or downhill.

DETAILED DESCRIPTION

Figure 5:
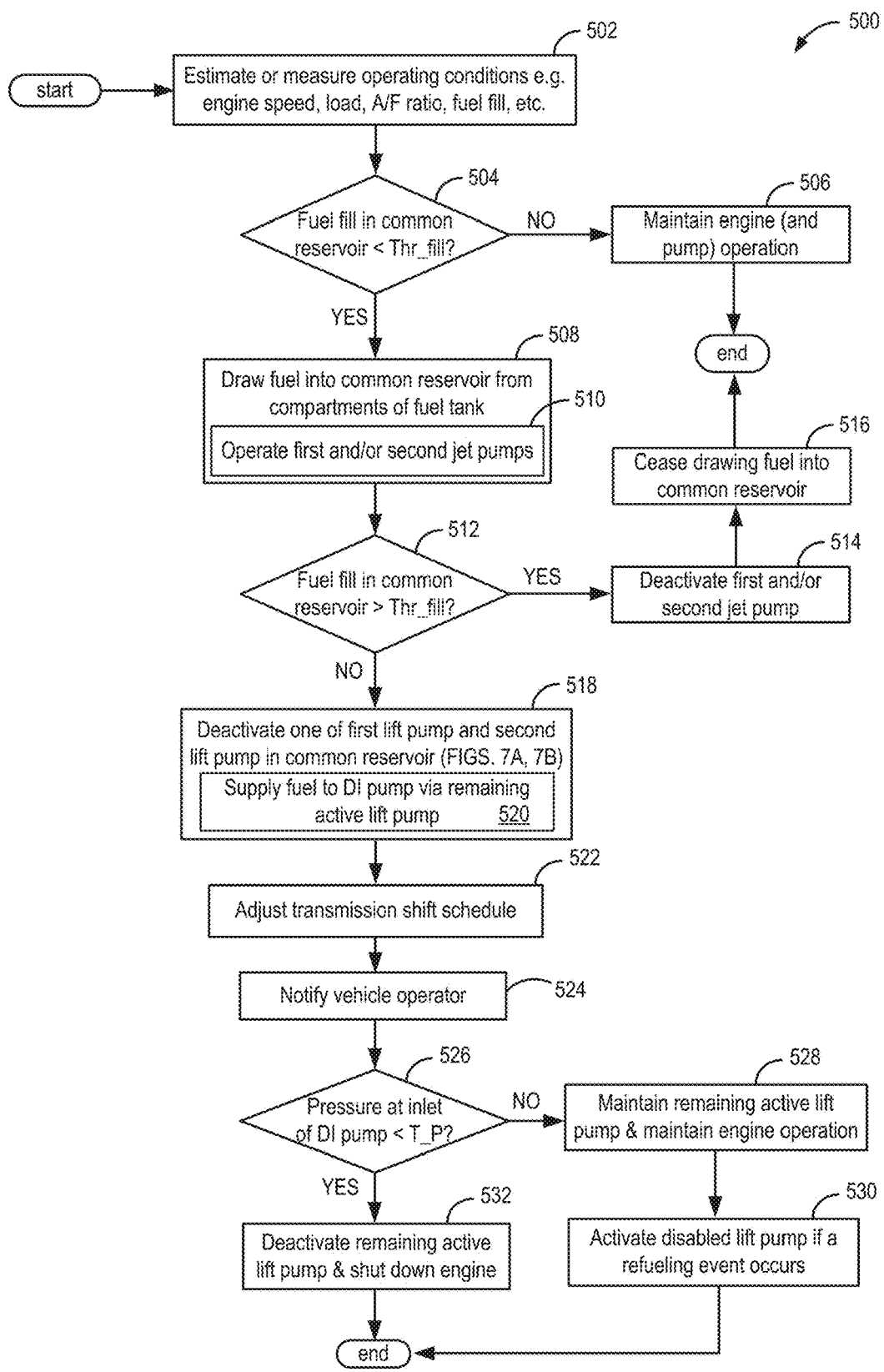
FIG. 5 is an example flow chart illustrating a routine for operating the engine when a fuel fill in the common reservoir is lower than a fuel fill threshold.
Figure 6:
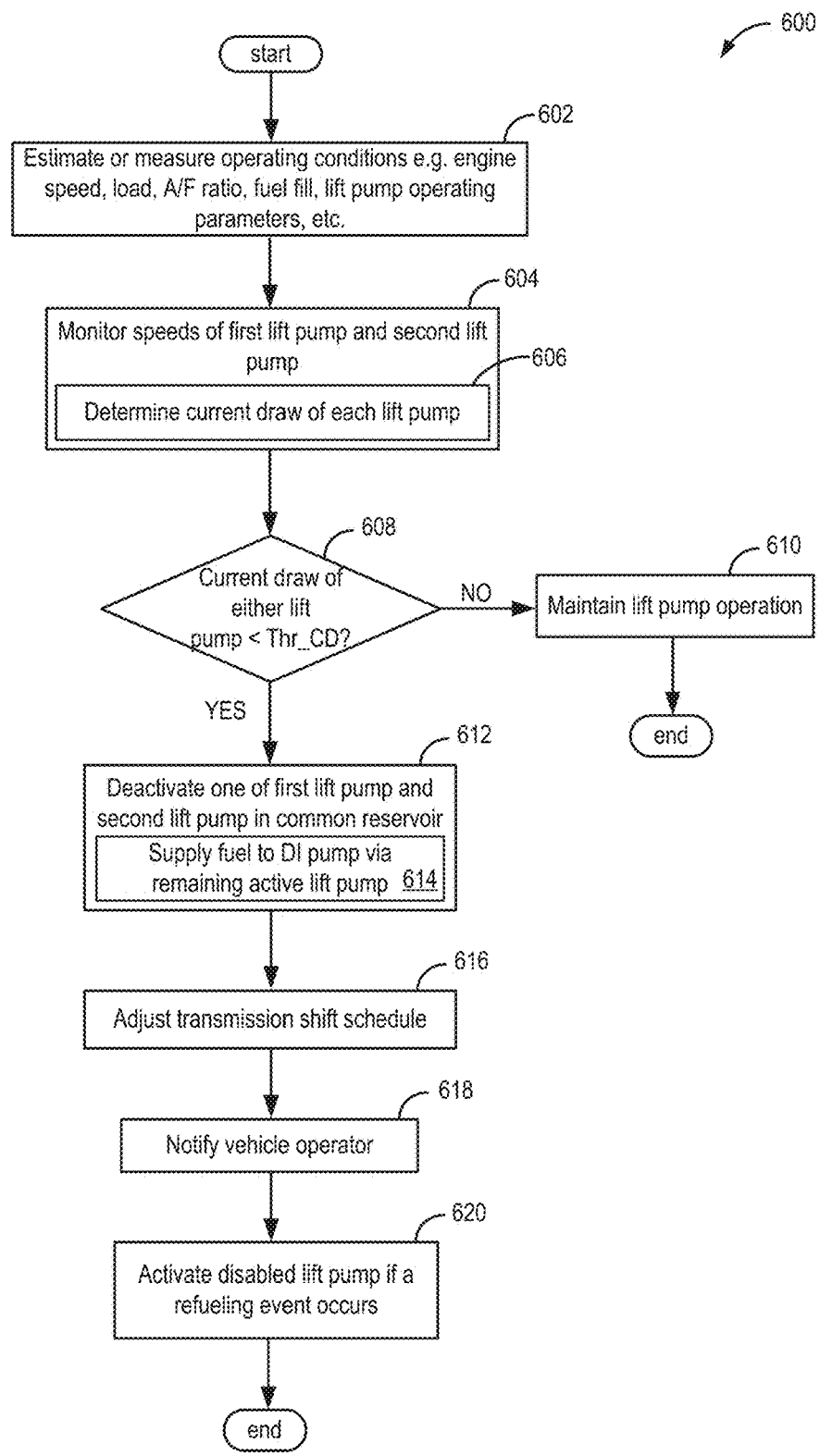
FIG. 6 is an example flow chart depicting a routine for using a current draw of the two lift pumps to determine deactivation of one of the two lift pumps.

The following description relates generally to systems and methods for reducing lift pump degradation due to lower fuel fills in a fuel tank. In one example engine system, the engine may receive fuel from a fuel system including at least dual lift pumps, such as the example engine system of FIG. 1. The dual lift pumps herein may be positioned within a common reservoir, and the common reservoir may be located within a fuel tank. A controller may be configured with instructions to disable one of the dual lift pumps in response to fuel fill in the common reservoir, (and the fuel tank) being lower than a threshold (FIG. 5). Alternatively, one of the dual lift pumps may be deactivated if either of the dual lift pumps draws a current that is lower than a current draw threshold (FIG. 6). The controller may select one of the dual lift pumps to disable (FIGS. 7A and 7B) based on whether the vehicle is traveling on an inclined surface (FIGS. 3A and 3B), driving uphill or downhill (FIGS. 4A and 4B), and turning right or left (FIGS. 2A and 2B). Additionally or alternatively, a lift pump of the dual lift pumps may be deactivated by random selection. An example operation including deactivation of the dual lift pumps based on fuel fill is depicted in FIG. 8. In another example engine system, such as the engine system depicted in FIGS. 9A and 9B, the engine may be a bi-fuel engine. As one non-limiting example, the bi-fuel engine may be fueled by one or both of a first gaseous fuel and a second liquid fuel. A controller coupled to the bi-fuel engine may perform a routine such as that depicted in FIGS. 10A and 10B to modify lift pump operation based on fuel fill levels of the first gaseous fuel and the second liquid fuel. In this manner, fuel pump degradation due to fuel starvation may be reduced.

Figure 1:
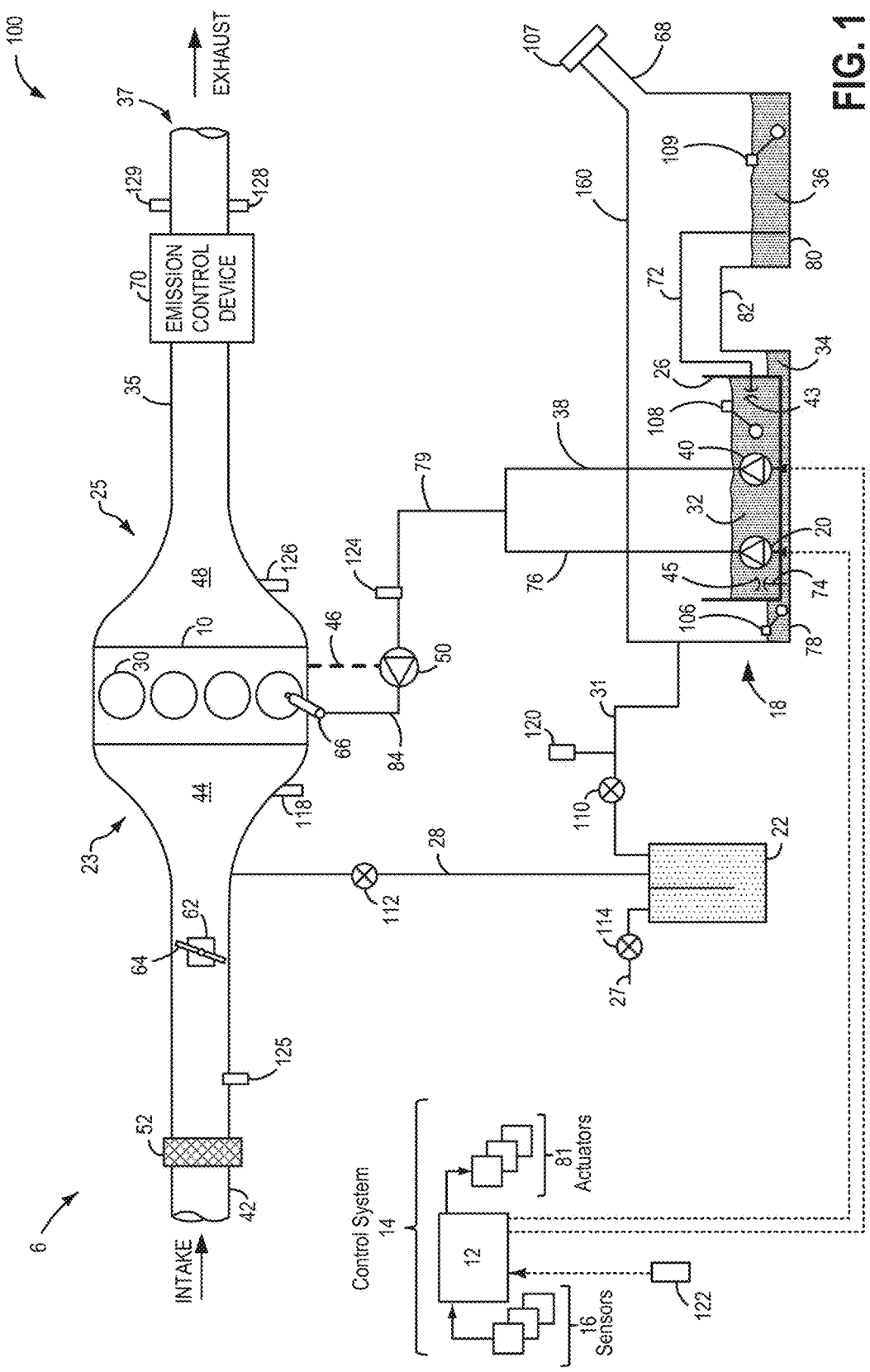
FIG. 1 schematically depicts an engine coupled to a fuel system including two lift pumps, wherein the two lift pumps are situated in a common reservoir.
Figure 2A:
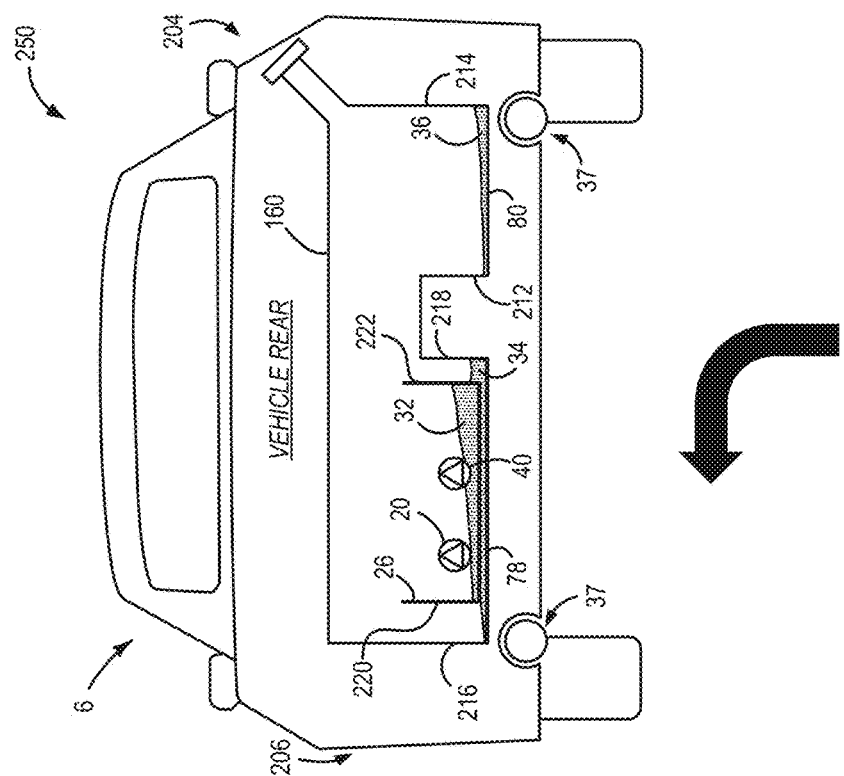
FIGS. 2A and 2B schematically illustrate changes in fuel levels within the common reservoir as a vehicle with the engine and fuel system of FIG. 1 turns either to the right or the left.
Figure 2B:
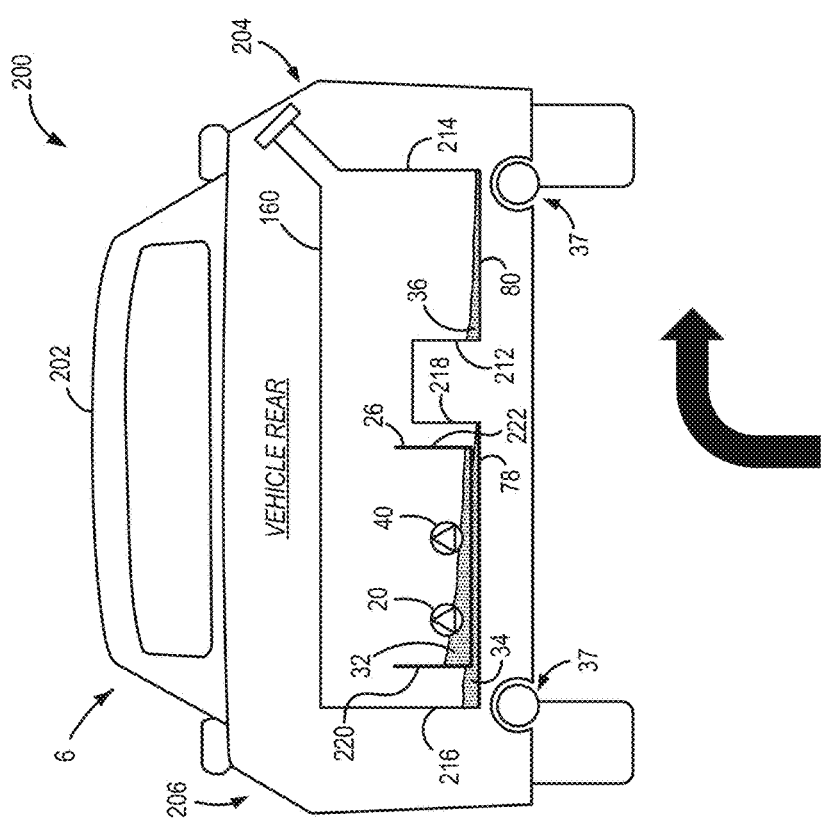

Turning now to FIG. 1, it shows a schematic depiction of an engine system 100 coupled in a vehicle system 6. The vehicle system 6 includes an engine 10 having a plurality of cylinders 30. The engine system 100 includes an intake 23 and an exhaust 25. The intake 23 includes a throttle 62 fluidically coupled to the intake manifold 44. Fresh intake air enters the intake passage 42 and flows through air filter 52 before streaming past throttle 62 (also termed intake throttle 62). Throttle 62 includes a throttle plate 64, and in the depicted example a position of the intake throttle 62 (specifically, a position of the throttle plate 64) may be varied by controller 12 of control system 14 via a signal provided to an electric motor or actuator included with intake throttle 62, a configuration that is commonly referred to as electronic throttle control (ETC). In this manner, throttle 62 may be operated to vary an amount of intake air provided to intake manifold 44 and the plurality of cylinders therein.

The exhaust 25 includes an exhaust manifold 48 leading to an exhaust passage 35 that routes exhaust gas to the atmosphere via tail pipe 37. The exhaust 25 may include one or more emission control devices 70, which may be mounted in a close-coupled position in the exhaust. One or more emission control devices may include a three-way catalyst, lean NOx trap, diesel or gasoline particulate filter, oxidation catalyst, etc. It can be appreciated that other components may be included in the engine such as a variety of valves and sensors. In some embodiments, wherein engine system 100 is a boosted engine system, the engine system may further include a boosting device, such as a turbocharger (not shown).

Engine system 100 may receive fuel from a fuel system 18. Specifically, fuel system 18 may include one or more pumps for pressurizing fuel delivered to one or more fuel injectors 66 of engine 10. While only a single fuel injector 66 is shown, additional injectors are provided for each cylinder. It will be appreciated that fuel system 18 may be a return-less fuel system, a return fuel system, or various other types of fuel system. As such, fuel injector 66 is shown coupled directly to cylinder 30 for injecting fuel directly therein to provide what is known as direct injection of fuel into cylinder 30. Accordingly, fuel injector 66 receives fuel at a higher pressure from direct injection pump 50. In some embodiments, engine system 100 may alternatively or additionally include a fuel injector arranged in intake manifold 44 in a configuration that provides what is known as port injection of fuel into the intake port upstream of plurality of cylinders 30.

Fuel system 18 includes a fuel tank 160 coupled to a fuel vapor canister 22. During a fuel tank refueling event, fuel may be pumped into the vehicle from an external source through refueling inlet 107 and refueling line 68. Refueling line 68 acts as a passageway between the fuel tank 160 and refueling inlet 107, which may be covered by a gas cap (not shown). During a refueling event, while fuel is pumped into fuel tank 160, one or more valves (e.g. vapor blocking valve 110 and canister vent valve 114) may be opened to allow refueling vapors to be directed to, and stored in, fuel vapor canister 22. Fuel tank 160 may hold one of a plurality of fuel blends, including fuel with a range of alcohol concentrations, such as various gasoline-ethanol blends, including E10, E85, gasoline, etc., and combinations thereof.

Fuel vapor canister 22, also termed canister 22, is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters.

Canister 22 includes a vent line 27 for routing gases out of the canister 22 to the atmosphere when storing, or trapping, fuel vapors from fuel tank 160. For example, during a refueling event fuel vapors generated in fuel tank 160 may be directed via conduit 31 and through vapor blocking valve 110 into canister 22. Further, these fuel vapors may be trapped within the canister 22 and air, stripped of fuel vapors after having passed through the canister, can be pushed out to the atmosphere through vent line 27. As explained earlier, the vapor blocking valve 110 (coupled in conduit 31) and canister vent valve 114 (coupled in vent line 27) may be opened from closed during the refueling event to allow fuel vapor storage within the canister 22.

Vent line 27 may also allow fresh air to be drawn into fuel vapor canister 22 when purging stored fuel vapors to engine intake 23 via purge line 28 and purge valve 112. While this example shows vent line 27 communicating with fresh, unheated air, various modifications may also be used. Canister vent valve 114 included in vent line 27 may adjust a flow of air and vapors between canister 22 and the atmosphere. The canister vent valve may also be used for diagnostic routines. When included, the canister vent valve may be opened during fuel vapor storing operations (for example, during fuel tank refueling and while the engine is not running). Likewise, during purging operations (for example, during canister regeneration and while the engine is running), the canister vent valve may be opened to allow a flow of fresh air to strip the fuel vapors stored in the canister.

In some embodiments such as hybrid vehicles, the vapor blocking valve 110 may be replaced by a fuel tank isolation valve (FTIV) that may be optionally included in conduit 31 such that fuel tank 160 is coupled to canister 22 via the FTIV. During regular engine operation, the FTIV may be kept closed to limit the amount of diurnal or "running loss" vapors directed to canister 22 from fuel tank 160. During refueling operations, and selected purging conditions, the FTIV may be temporarily opened, e.g., for a duration, to direct fuel vapors from the fuel tank 160 to canister 22. By opening the FTIV during purging conditions when the fuel tank pressure is higher than a threshold (e.g., above a mechanical pressure limit of the fuel tank above which the fuel tank and other fuel system components may incur mechanical degradation), the refueling vapors may be released into the canister and the fuel tank pressure may be maintained below pressure limits.

Pressure sensor 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 160 for estimating a fuel tank pressure or vacuum level. While the depicted example shows pressure sensor 120 coupled between the fuel tank and canister 22, specifically between the fuel tank and vapor blocking valve 110, in alternate embodiments, the pressure sensor may be directly coupled to fuel tank 160.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake.

Fuel tank 160 is depicted as a saddle tank (also termed, a bifurcated fuel tank) including at least two compartments: a first compartment 78 and a second compartment 80. The compartments may also be referred to as sections and/or as sumps. In one example, a saddle fuel tank may be utilized in rear wheel drive vehicles. In another example, saddle fuel tanks may be included in all wheel drive vehicles. The first compartment 78 may be fluidically coupled to second compartment 80 via section 82. First compartment 78 includes a reservoir 26 (also termed herein as common reservoir 26) situated within the first compartment 78. As such, reservoir 26 may be substantially enclosed within first compartment 78. Further, each of the reservoir 26, the first compartment 78, and second compartment 80 may contain fuel. Specifically, reservoir 26 contains fuel 32, first compartment 78 holds fuel 34, and second compartment contains fuel 36.

A distinct fuel level sensor is situated within each of the reservoir 26, the first compartment 78, and second compartment 80 to measure corresponding fuel levels and provide an indication of the fuel fill levels within each of the reservoir 26, the first compartment 78, and second compartment 80 to controller 12. Specifically, a level of fuel 32 within reservoir 26 may be monitored by reservoir fuel level sensor 108 while a level of fuel 34 in first compartment 78 may be sensed by first compartment (FC) fuel level sensor 106. Likewise, a level of fuel 36 within second compartment 80 may be detected by second compartment (SC) fuel level sensor 109. Each fuel level sensor may provide an estimate of an amount of fuel fill within the corresponding compartments and reservoir. As depicted, each fuel level sensor may comprise a float connected to a variable resistor. Alternatively, other types of fuel level sensors may be used. In yet other embodiments, reservoir fuel level sensor 108 may not be present. Herein, the fuel fill level in the reservoir 26 may be inferred from output of the FC fuel level sensor 106.

Second compartment 80 does not include a reservoir but may function as a passive storage area for fuel. Similarly, first compartment 78 may also function as a sump for fuel 34 which can be transferred into reservoir 26 via first jet pump 45 along first fuel transfer line 74. Fuel 36 situated within second compartment 80 may be transferred to reservoir 26 via second jet pump 43 along a second fuel transfer line 72. Each of first jet pump 45 and second jet pump 43 may be operated, as known in the art, by flowing fuel from either a return line (not shown) or by flowing pressurized fuel from one of first lift pump 20 and second lift pump 40 therethrough (not shown) to generate vacuum at a throat of the jet pump. The vacuum generated at the throat of the jet pump may enable drawing of fuel from the sumps into the reservoir. For example, vacuum generated at the throat of first jet pump 45 draws in additional fuel from first compartment 78 via first fuel transfer line 74. Vacuum generated at the throat of the second jet pump 43 draws fuel 36 from second compartment 80 via second fuel transfer line 72. Thus, reservoir 26 may receive fuel from one or more of first compartment 78 and second compartment 80. Specifically, when fuel level within the reservoir 26 reduces below a first threshold, one or both of the first jet pump and the second jet pump may be operated to draw fuel into the reservoir 26. The first threshold may be distinct from the fuel fill threshold for determining deactivation of one of the first lift pump and the second lift pump. In one example embodiment, each of the jet pumps may receive its respective motive flow from the lift pumps and may continuously attempt to fill the reservoir 26. If the reservoir is over-filled, fuel spills into first compartment 78.

Reservoir 26 in turn includes a first lift pump 20 and a second lift pump 40. As depicted in FIG. 1, the first lift pump 20 and the second lift pump 40 are positioned together within reservoir 26. Thus, reservoir 26 may be termed a common reservoir. As such, reservoir 26 may be common to each of first lift pump 20 and second lift pump 40. To elaborate, each of first lift pump 20 and second lift pump 40 draws fuel 32 from common reservoir 26.

In one example, vehicle 6 may be a high performance vehicle and engine 10 of vehicle 6 may provide a higher power based on the higher torque demanded by vehicle 6. As such, vehicles designed for higher performance may require a higher fuel flow rate. Accordingly, fuel system 18 of engine system 100 includes two lift pumps. First lift pump 20 and second lift pump 40 may be lower pressure pumps wherein each of the lift pumps supplies fuel to an inlet of direct injection pump 50. In other words, each of the first lift pump 20 and the second lift pump 40 is fluidically coupled to direct injection (DI) pump 50. Specifically, first lift pump 20 is fluidically coupled to DI pump 50 via first channel 76 and common passage 79. Meanwhile, second lift pump 40 delivers fuel to DI pump 50 via second channel 38 and common passage 79.

Pressure sensor 124 monitors fuel pressure within common passage 79. Herein, pressure sensor 124 may sense a pressure of fuel at the inlet of DI pump 50. Further, pressure sensor 124 may also measure the pressure of fuel being supplied by the two lift pumps. As such, when activated, each of the first lift pump 20 and the second lift pump 40 may operate at the same time and supply fuel to the inlet of the DI pump 50 concurrently. If only one of the two lift pumps is activated, the pressure sensor 124 may estimate output pressure of the activated lift pump. Further still, DI pump 50 may pressurize fuel received from one or both lift pumps (e.g., to a higher pressure) and supply fuel at the higher pressure to direct fuel injector(s) 66 via conduit 84. As such, conduit 84 may fluidically couple an outlet of DI pump 50 to fuel injector 66. In this way, fuel 32 within common reservoir 26 may be supplied via the first lift pump 20, the second lift pump 40, and DI pump 50, to each of direct injectors 66 fueling cylinders 30 of engine 10.

It will be noted that each of first lift pump 20 and second lift pump 40 may be electrically actuated whereas DI pump 50 may be an engine driven pump. As such, each of first lift pump 20 and second lift pump 40 may receive electrical power for actuation while DI pump 50 receives mechanical power from engine 10 via coupling 46. Further, each of first lift pump 20 and second lift pump 40 may be activated or deactivated based on engine conditions, fuel system conditions, etc. by controller 12.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (such as a linear UEGO sensor) located upstream of the emission control device 70, temperature sensor 128, and downstream exhaust gas sensor 129 (such as a binary HEGO sensor). An estimate of the manifold airflow (MAF) may be obtained from MAF sensor 125 coupled to intake passage 42. Alternatively, MAF may be inferred from alternate engine operating conditions, such as manifold absolute pressure (MAP), as measured by a MAP sensor 118 coupled to the intake manifold 44. Controller may also receive signals from previously introduced sensors such as pressure sensor 124, pressure sensor 120, and the various fuel level sensors of fuel system 18. Controller 12 may also receive information regarding a tilt of vehicle system 6 from sensor 122. In one example, sensor 122 may be an inclinometer that senses grade readings.

The controller 12 receives signals from the various sensors of FIG. 1 and employs the various actuators of FIG. 1 to adjust engine operation as well as fuel system operation based on the received signals and instructions stored on a memory of the controller. Example actuators may include first lift pump 20, second lift pump 40, fuel injector 66, throttle 62, vapor blocking valve 110, etc.

As such, when the two lift pumps are operating simultaneously in fuel system 18, low fuel fill levels in common reservoir 26 may cause degradation of one of the two lift pumps. Degradation may occur as one of the lift pumps runs dry before the other lift pump. To reduce a likelihood of such degradation, one of the two lift pumps may be disabled and shut down in response to a fuel fill level in the reservoir being lower than a fuel fill threshold. Specifically, the fuel fill level may be lower than the fuel fill threshold when fuel fill in each of the first compartment and the second compartment of the fuel tank is significantly low. As such, fuel fill in each of the first compartment and the second compartment of the fuel tank may be lower than their respective fill thresholds. Further, fuel transfer from each of the first compartment and the second compartment into the common reservoir may not supply adequate fuel into the common reservoir to raise the fuel fill level in the common reservoir to above the fuel fill threshold.

The controller, such as controller 12, may disable either the first lift pump or the second lift pump based on corresponding lift pump location within the common reservoir and based on whether the vehicle is traveling on an incline, a surface with a tilt, rounding a corner, etc. Herein, fuel levels may vary within the common reservoir. Accordingly, the controller may select one of the first lift pump and the second lift pump to deactivate based on the location of the first lift pump and the second lift pump within the common reservoir. Further, since a single lift pump is available at substantially low fuel fill levels, fuel flow rate and thus, engine power may be reduced.

As an example, FIGS. 2A and 2B present schematic illustrations 200 and 250 respectively depicting changes in fuel fill level in a fuel tank, such as fuel tank 160, of a vehicle, such as vehicle system 6, as the vehicle travels around a turn. Schematic illustration 200 depicts vehicle system 6 turning right (or in a right direction) while schematic illustration 250 portrays the vehicle 6 turning left (or in a left direction). Further, each of the schematic illustrations 200 and 250 depicts a view of a rear of the vehicle 6. As such, an observer may be looking at the rear of the vehicle 6. For example, tail pipes 37 are shown at the rear of the vehicle.

Further still, fuel fill levels in fuel tank 160 may be low. As a non-limiting example, fuel tank 160 may be positioned as shown in each of schematic illustrations 200 and 250 relative to a top 202 of vehicle 6, a right side 204 of vehicle 6, and a left side 206 of vehicle 6. Since FIGS. 2A and 2B depict vehicle 6 of FIG. 1, components previously introduced in FIG. 1 are numbered the same and not re-introduced. It will also be appreciated that multiple components of fuel system 18, previously introduced in FIG. 1 are not depicted in FIGS. 2A and 2B for the sake of brevity and clarity of view.

As vehicle 6 turns towards the right (or curves right) in FIG. 2A, fuel in fuel tank 160 shifts towards the left due to centrifugal forces. Specifically, fuel in fuel tank 160 moves in a direction towards left side 206 of vehicle 6. To elaborate, fuel 36 in second compartment 80 travels towards left side 212 of second compartment 80 away from right side 214 of second compartment 80, while fuel 34 in first compartment shifts towards left side 216 of first compartment 78 and away from right side 218 of first compartment 78. At the same time, fuel 32 within common reservoir 26 moves away from right side 222 of common reservoir 26 towards left side 220 of common reservoir 26.

Due to the accumulation of substantial fuel towards the left side 220 of common reservoir 26, first lift pump 20 (situated closer to left side 220 of common reservoir 26) may be submerged in a higher amount of fuel relative to second lift pump 40. Due to depletion of fuel at the right side 222 of common reservoir 26, a fuel pickup tube of second lift pump 40 (located closer to right side 222 of common reservoir 26) may not be submerged in sufficient fuel and may thereby not collect desired fuel for the second lift pump. Accordingly, if both lift pumps are operating simultaneously with the depicted amounts of fuel in the common reservoir as the vehicle turns towards the right, second lift pump 40 may encounter fuel starvation. In other words, second lift pump 40 situated towards (e.g., closer to) right side 222 of common reservoir 26 and towards right side 204 of vehicle 6 may encounter fuel starvation as the vehicle 6 turns right. Thus, responsive to fuel fill level in the common reservoir being lower than the fill threshold when the vehicle is turning right, the controller may disable the second lift pump 40 while maintaining the first lift pump operational. Specifically, the controller may disable the lift pump that is positioned closer to the right side of the vehicle (relative to the other lift pump) and the right side of the common reservoir while maintaining active the lift pump that is located closer to the left side of the vehicle (and the left side of the common reservoir) when the vehicle is turning right on a curve. As such, the lift pump that is proximal the right side (e.g., the second lift pump 40 in FIG. 2A) of the common reservoir may be deactivated as there is a higher likelihood of the second lift pump undergoing degradation due to fuel starvation.

In the schematic illustration 250 of FIG. 2B, vehicle 6 is depicted as turning left. Accordingly, fuel in fuel tank 160 shifts towards right side 204 of vehicle 6 due to centrifugal forces. Specifically, fuel in common reservoir 26 moves in the direction of right side 204 of vehicle 6. To elaborate, fuel 36 in second compartment 80 of fuel tank 160 travels towards right side 214 of second compartment 80 away from left side 212 of second compartment 80. Further, fuel 34 in first compartment 78 of fuel tank 160 shifts towards right side 218 of first compartment 78 away from left side 216 of first compartment 78. At the same time, fuel 32 within common reservoir 26 moves away from left side 220 of common reservoir 26 towards right side 222 of common reservoir 26.

Accordingly, as the vehicle turns left, fuel in the common reservoir 26 collects at the right side 222 of the common reservoir. Thus, second lift pump 40 placed towards (e.g., closer to) right side 222 of the common reservoir 26 (and towards right side 204 of vehicle 6) may now be immersed in a deeper amount of fuel 32 relative to first lift pump 20. Thus, fuel pickup tube of first lift pump 20 may not pick up desired fuel to operate the first lift pump. The controller, in this situation, may disable the first lift pump 20 in response to determining that the fuel fill in common reservoir 26 is lower than the fuel fill threshold. Thus, when the vehicle is turning left and fuel fill level in the common reservoir is lower than the fill threshold, the lift pump that is closer to the left side 206 of vehicle 6 (e.g., the first lift pump 20) may be deactivated. In other words, the lift pump that is closer to the left side 220 of the common reservoir 26 (relative to the other lift pump) may be disabled when fuel fill in the common reservoir is lower than the fuel fill threshold and the vehicle is traveling on a curve that turns left. At the same time, the lift pump closer to the right side 222 of the common reservoir (and closer towards right side 204 of vehicle 6) may be maintained operative to fuel the engine.

Accordingly, the controller may select one of the first lift pump and the second lift pump to disable when fuel fill in the common reservoir is lower than the fuel fill threshold based on whether the vehicle is turning in a specific direction. The lift pump that is selected for deactivation may be further based on its proximity (e.g., proximity of the lift pump selected for deactivation) to the specific direction within the common reservoir. Thus, if the vehicle is turning towards the right direction, the lift pump positioned closer to a right side of the common reservoir (and towards right side of the vehicle) may be disabled. Alternatively, if the vehicle is turning in the left direction, the lift pump proximal to the left direction within (e.g., closer to left side of) the common reservoir may be deactivated.

Referring now to FIGS. 3A and 3B, they depict schematic illustrations 300 and 350 portraying vehicle travel on an inclined surface. Specifically, schematic illustration 300 presents vehicle 6 traveling on a first inclined surface 320 wherein the first inclined surface is inclined towards the left side 206 of the vehicle 6 (and left side of the page and viewer). Schematic illustration 350, on the other hand, portrays vehicle 6 traveling on a second inclined surface 325 wherein the second inclined surface 325 is inclined towards the right side 204 of the vehicle 6 (and right side of page and viewer). It will be noted that vehicle 6 in each of the schematic illustrations is positioned on top of the first and second inclined surfaces 320 and 325 respectively relative to gravitational force. As in schematic illustrations 200 of FIG. 2A and schematic illustration 250 of FIG. 2B, schematic illustrations 300 and 350 depict vehicle 6 from behind. In other words, an observer when viewing the schematic illustrations is observing the rear of the vehicle 6.

When vehicle 6 is positioned on first inclined surface 320, fuel in fuel tank 160 shifts towards the left side 206 of vehicle 6 as the first inclined surface 320 is inclined to the left of the vehicle 6. Specifically, fuel 32 in common reservoir 26 shifts towards and accumulates at left side 220 of common reservoir 26. Meanwhile and at the same time, fuel 36 in second compartment 80 travels towards left side 212 of second compartment 80 away from right side 214 of second compartment 80, while fuel 34 in first compartment shifts towards left side 216 of first compartment 78 away from right side 218 of first compartment 78. Herein, first lift pump 20 (situated closer to left side 220 of common reservoir 26) may be immersed in a higher amount of fuel than the second lift pump 40 (situated closer to right side 222 of common reservoir 26). Accordingly, the controller may deactivate and shut down second lift pump 40 as the second lift pump is submerged in lesser amount of fuel. As such, the second lift pump 40 may encounter fuel starvation due to low fuel fill in the common reservoir 26 when the vehicle is on a surface that is inclined towards the left side of the vehicle. Specifically, the controller may disable the second lift pump 40 that is situated closer to the right side 222 of the common reservoir 26. As such, the second lift pump 40 is situated towards (or closer to) right side 204 of vehicle 6 and at a greater distance from left side 206 of vehicle 6. Thus, when traveling on a surface that is inclined to the left, the lift pump located closer to the right side of the common reservoir (and closer to right side of the vehicle) may be deactivated. Further, the lift pump situated towards the left side of the common reservoir (and closer to left side of the vehicle) may be maintained active. In other words, the lift pump that is situated away from the direction of incline may be disabled by the controller when fuel fill in the reservoir is lower than the fuel fill threshold. Further, the lift pump that is positioned towards the direction of incline may be maintained active.

When vehicle 6 is located on the second inclined surface 325 which is inclined towards the right side 204 of vehicle 6, as shown in FIG. 3B, fuel within each of the common reservoir 26, first compartment 78, and second compartment 80 of fuel tank 160 moves towards (e.g., in the direction of) the right side 204 of vehicle 6. Specifically, fuel 32 in common reservoir 26 travels towards right side 222 of common reservoir and away from left side 220 of common reservoir 26. Simultaneously, fuel 34 in first compartment 78 shifts to the right side 218 of first compartment 78 away from left side 216 of first compartment 78. At the same time, fuel 36 in second compartment 80 moves away from left side 212 of second compartment 80 towards right side 214 of second compartment 80. Herein, the second lift pump 40 situated towards (or closer to) right side 222 of common reservoir 26 is submerged in a deeper level of fuel 32 relative to first lift pump 20 positioned closer to left side 220 of common reservoir 26.

Accordingly, the controller may deactivate and shut down first lift pump 20 as the first lift pump is submerged in lesser amount of fuel and may encounter fuel starvation due to low fuel fill issues in the common reservoir 26. Specifically, the controller may disable the first lift pump 20 that is situated closer to the left side 220 of the common reservoir 26 when the vehicle is traveling on an inclined surface 325 that is inclined towards the right side 204 of the vehicle. To elaborate, the first lift pump 20 situated towards the left side 206 of vehicle 6 and at a greater distance from right side 204 of vehicle 6 may be disabled. Thus, when the vehicle is traveling on a surface that is inclined to the right, the lift pump situated at or towards the left side of the common reservoir (and closer to the left side of the vehicle) may be deactivated. Further, the lift pump situated at or towards the right side of the common reservoir (and closer to the right side of the vehicle) may be maintained active. In other words, the lift pump that is situated away from the direction of incline may be disabled by the controller when fuel fill in the reservoir is lower than the fuel fill threshold. In other words, the lift pump that is positioned towards the direction of incline may be maintained active.

FIGS. 4A and 4B depict schematic illustrations 400 and 450 respectively, portraying a vehicle traveling either uphill or downhill. Specifically, schematic illustration 400 presents vehicle 6 traveling on an uphill surface 420 while schematic illustration 450 portrays vehicle 6 traveling on a downhill surface 425. Unlike schematic illustrations 200, 250, 300, and 350, schematic illustrations 400 and 450 depict vehicle 6 from a side of the vehicle. Specifically, an observer when viewing the schematic illustrations 400 and 450 is viewing a side of the vehicle 6. The side depicted in FIGS. 4A and 4B may be a left side of the vehicle (e.g., left side 206 of vehicle 6).

Schematic illustration 400 of FIG. 4A presents vehicle 6 driving up a slope. As such, vehicle 6 may be ascending on uphill surface 420. Herein, a side view of fuel tank 160 is depicted. Specifically, the side view of fuel tank 160 primarily shows common reservoir 26. First compartment 78 and other components of fuel system 18 are not depicted for the sake of clarity. Further, first lift pump 20 may be positioned ahead of second lift pump 40 relative to a front of vehicle 6. Specifically, first lift pump 20 may be located closer to the front of the vehicle than second lift pump 40. In alternative examples, the second lift pump 40 may be positioned closer to the front of the vehicle than the first lift pump 20.

When traveling uphill, fuel in the fuel tank may shift in a direction towards the rear of the vehicle. Herein, fuel 32 in common reservoir 26 moves away from front 414 of common reservoir 26 and towards rear 412 of common reservoir 26. Thus, fuel 32 accumulates substantially towards rear 412 of the common reservoir 26 enabling second lift pump 40 to be submerged in a deeper amount of fuel relative to first lift pump 20. As such, first lift pump 20 may not be immersed in adequate fuel allowing robust operation of the first lift pump. Accordingly, the first lift pump 20 may be deactivated by the controller responsive to a fuel fill level in the common reservoir being lower than the fuel fill threshold. Thus, the controller may disable a lift pump that is situated closer to the front of the vehicle and closer to a front end of the common reservoir (relative to other lift pump) when the vehicle is traveling on an upward slope. Further, a lift pump that is located closer to the rear of the vehicle and closer to a rear end of the common reservoir (relative to other lift pump) may be maintained active.

On the other hand, schematic illustration 450 of FIG. 4B shows vehicle 6 driving down a slope. As such, vehicle 6 may be descending on downhill surface 425. Similar to schematic illustration 400, a side view of common reservoir 26 in fuel tank 160 is depicted in FIG. 4B while first compartment 78 and other components of fuel tank 160 are not shown for the sake of clarity. Similar to schematic illustration 400 of FIG. 4A, first lift pump 20 may be positioned ahead of second lift pump 40 within common reservoir 26 relative to the front of vehicle 6. Specifically, first lift pump 20 may be located forward relative to second lift pump 40. In other words, first lift pump 20 may be located closer to the front of vehicle 6 inside common reservoir 26 relative to second lift pump 40. In alternative examples, the second lift pump 40 may be positioned closer to the front of the vehicle than the first lift pump 20.

When traveling downhill, fuel in the fuel tank may shift in a direction towards the front of the vehicle. Specifically, fuel 32 in common reservoir 26 moves away from rear 412 of common reservoir 26 and towards front 414 of common reservoir 26. Thus, fuel 32 accumulates substantially towards front 414 of the common reservoir 26 enabling first lift pump 20 to be submerged in a deeper amount of fuel relative to second lift pump 40. As such, second lift pump 40 may not be immersed in adequate fuel that would allow robust operation of the second lift pump. Accordingly, the second lift pump 40 may be deactivated by the controller responsive to a fuel fill level in the common reservoir being lower than the fuel fill threshold. Thus, the controller may disable a lift pump that is situated closer to the rear of the vehicle and closer to the rear end of the common reservoir when the vehicle is traveling on a downward slope. Further, the lift pump that is located closer to the front of the vehicle and closer to the front end of the common reservoir may be maintained active.

In this manner, each of the dual lift pumps may be protected from degradation during low fuel fill in the common reservoir and the compartments of the fuel tank. One of the two lift pumps may be shut down while the other is maintained operational. As such, the operative lift pump may continue to supply fuel to the DI pump and thereon to the engine. The one lift pump to be disabled may be selected based on whether the vehicle is traveling on an inclined surface, traveling uphill or downhill, and/or rounding a corner. Herein, a tilt and/or gradient of the surface that the vehicle is traveling upon may significantly affect fuel levels at different locations within the common reservoir, and the compartments of the fuel tank.

FIG. 5 presents an example routine 500 illustrating changes in lift pump operation based on fuel fill levels within a fuel tank, specifically within a common reservoir of the fuel tank. Specifically, in a fuel system comprising two lift pumps positioned in the same common reservoir, as shown in FIG. 1, one of the two lift pumps may be disabled and shut down in response to low fuel fill levels within the fuel tank. As such, routine 500 will be described in relation to the example system shown in FIG. 1, but it should be understood that similar routines may be used with other systems without departing from the scope of this disclosure. For example, routine 500 may also be utilized in a fuel system which does not include a separate fuel level sensor for common reservoir 26. Instructions for carrying out routine 500 included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system, such as the actuators of FIG. 1 to adjust engine operation, according to the routines described below.

At 502, routine 500 estimates and/or measures existing engine conditions as well as existing fuel system conditions. For example, engine conditions such as engine speed, engine load, MAP, air fuel ratio, etc. may be estimated. Further, fuel system conditions such as fuel levels within each of the common reservoir, first compartment, and second compartment may also be estimated and/or measured. Next, at 504, routine 500 determines if fuel fill within the common reservoir is lower than a fuel fill threshold, Thr_fill. In one example, fuel level within the common reservoir as sensed by fuel level sensor 108 of FIG. 1 may be communicated to controller 12. In another example wherein the common reservoir does not have a corresponding fuel level sensor, fuel fill in the common reservoir may be inferred based on output received from a fuel level sensor of the first compartment, such as fuel level sensor 106 of FIG. 1. Herein, the fuel fill level in the first compartment may be compared to the fuel fill threshold.

In one example, the fuel fill threshold may be 10% of the volume of the common reservoir. In another example, Thr_fill may be 7% of the volume of the common reservoir. If it is determined that fuel fill within the common reservoir (or fuel fill in the first compartment) is not lower than a fuel fill threshold, routine 500 continues to 506 to maintain engine operation as well to maintain operation of both lift pumps. Routine 500 then ends.

If, on the other hand, it is determined that fuel fill within the common reservoir is lower than Thr_fill, routine 500 progresses to 508 to draw additional fuel into the common reservoir from one or both of the first compartment and second compartment of the fuel tank. Specifically, at 510, one or both of the first jet pump and the second jet pump is/are operated to draw additional fuel into the common reservoir. In the example where the common reservoir does not include a corresponding fuel level sensor, if the fuel fill in the first compartment is determined to be lower than the threshold fill, the second jet pump 43 may draw additional fuel into the first compartment from the second compartment. Further, the first jet pump 45 may then suck fuel into the common reservoir.

At 512, routine 500 confirms if the fuel fill in the common reservoir has increased to above the fuel fill threshold. As such, the fuel level may be sensed via the fuel level sensor. If the fuel fill within the common reservoir is higher than the fuel fill threshold, routine 500 continues to 514 to deactivate one or both of the first jet pump and the second jet pump. Next, at 516, routine 500 ceases the drawing of additional fuel into the common reservoir and ends.

It will be appreciated that in embodiments wherein each of the jet pumps is continuously operative due to lift pump operation (e.g., receiving motive flow from the lift pumps), routine 500 may proceed from 504 to 518 directly without performing 508-516.

However, if the fuel fill within the common reservoir remains below Thr_fill, routine 500 proceeds to 518 to disable one of first lift pump 20 and second lift pump 40. In one example, fuel fill in the common reservoir may not increase to higher than Thr_fill even though one or both jet pumps are operated if fuel fills in each of the first compartment and the second compartment of the fuel tank are lower. As such, routine 700 of FIGS. 7A and 7B may be activated to determine which of the first lift pump 20 and second lift pump 40 is to be disabled. Specifically, routine 700 may select the lift pump to be disabled based on whether the vehicle is traveling uphill or downhill, on a gradient, or on a tilted surface. Routine 700 will be described in further detail below.

Next at 518, the selected lift pump may be deactivated. Herein, one of the first lift pump and the second lift pump may be disabled. To elaborate, the controller may send a signal to terminate electrical power to the selected lift pump, and the selected lift pump may be shut down. In other words, the selected lift pump may not operate any longer and may not supply fuel to the DI pump. However, the remaining lift pump (of the two lift pumps) is maintained active and operational at 520. Specifically, the remaining lift pump may continue to receive electrical power. Thus, the DI pump receives fuel only from the remaining active lift pump.

In response to the deactivation of one of the two lift pumps, routine 500 adjusts a transmission shift schedule at 522. As such, the deactivation of one of the two lift pumps can affect the performance of the vehicle as fuel flow rate into the engine is decreased. Accordingly, a first transmission shift schedule when operating with both lift pumps may be modified to a distinct second transmission shift schedule in response to deactivating one of the lift pumps. Specifically, the second transmission shift schedule may be utilized when the engine is producing reduced torque due to a lower fuel flow rate. In one example, the transmission may be upshifted to reduce engine speed. By upshifting the transmission and reducing engine speed, fuel demand may be decreased. In another example, instead of adjusting transmission shift schedule, fuel flow may be adjusted (e.g., limited). For example, engine commanded fuel flow rate may be reduced.

At 524, routine 500 notifies an operator of the vehicle that fuel levels are lower and a refueling event is desired. Additionally, the operator may also be notified that available engine power is lower. For example, an indicator light may be activated to notify the operator that engine power is reduced and engine power lower than a threshold power e.g., a maximum power, is available for engine operation.

Next, at 526, routine 500 determines if a pressure (e.g., fuel pressure) at the inlet of the DI pump is lower than pressure threshold, T_P. Pressure at the inlet of the DI pump may be measured and/or estimated by a pressure sensor such as sensor 124 in common passage 79 of FIG. 1. The pressure threshold may be a desired pressure based on engine conditions. The pressure at the inlet of the DI pump may be similar to an output pressure of the remaining lift pump. If it is determined that the pressure at the inlet of the DI pump is at or higher than the pressure threshold, the remaining lift pump is maintained active and engine operation is continued at 528. Further, at 530, routine 500 activates the previously disabled lift pump if a refueling event occurs. The previously deactivated pump may be activated only in response to the refueling event occurring after a key-off event. As such, the refueling event may be determined in one example by an increase in the fuel levels of the second compartment, and in the first compartment. In another example, the refueling event may be confirmed based on unlocking a refueling lock of the vehicle. Routine 500 then ends.

If at 526 it is determined that pressure at the inlet of the DI pump is lower than the pressure threshold, routine 500 proceeds to 532 to deactivate the remaining lift pump. As such, the remaining lift pump may not be producing a desired pressure, e.g. pressure threshold, due to significantly lower fuel levels in the common reservoir. As an example, a fuel pickup tube of the remaining lift pump may not be collecting adequate fuel. In another example, the fuel in the fuel tank may be substantially exhausted (e.g., fuel fill in the common reservoir may be less than 5% of the volume), and the fuel tank may be empty. As the remaining active lift pump runs dry, fuel pressure may not be produced, and the engine may not operate and may stop combusting. As the engine shuts down to rest at 532, electrical power to the remaining active lift pump may cease, and the remaining lift pump may be deactivated. Routine 500 then ends. It will be noted that after a subsequent refueling event, each of the lift pumps may be activated.

In this way, degradation of lift pumps within a fuel tank may be reduced in situations where a fuel delivery module includes at least two lift pumps situated within a common, shared reservoir in the fuel tank. In other examples, the two or more lift pumps may be positioned within a common fuel tank. By deactivating one of the two lift pumps based on fuel levels being lower than the fuel fill threshold, the engine may continue to receive fuel from the remaining lift pump, and thereby the engine may continue to operate, albeit with a lower (e.g., lower than maximum) engine power. Further, if the fuel tank is drained of fuel, the remaining lift pump may simply be shut down as the engine ceases combustion and operation due to a termination of fuel supply.

Though not shown in routine 500 of FIG. 5, fuel levels within the first compartment 70 and the second compartment 80 may be communicated to the controller via respective fuel level sensors, in addition to the fuel level of common reservoir, at 504. If the fuel fills within each of the first compartment and the second compartment are determined to be lower than a threshold level, and the fuel fill in the common reservoir is lower than Thr_fill, routine 500 may continue directly to 518 from 504.

Turning now to FIG. 6, it depicts an example routine 600 for deactivating one of two lift pumps in a fuel system, such as fuel system 18 of FIG. 1, based on pump speed and current draw. Specifically, one of the two lift pumps may be disabled when current draw of one or both of the lift pumps is lower than a current draw threshold. For example, as fuel fill in a fuel tank decreases below a fuel fill threshold and a lift pump is filled with fuel vapor instead of liquid fuel, a speed of the lift pump increases which may reduce current draw. Thus, current draw of the lift pumps can be used as an additional measure of fuel levels.

Routine 600 will be described in relation to the example system shown in FIG. 1, but it should be understood that similar routines may be used with other systems without departing from the scope of this disclosure. Instructions for carrying out routine 600 included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system, such as the actuators of FIG. 1 to adjust engine operation, according to the routines described below.

At 602, routine 600 estimates and/or measures engine operating parameters such as engine speed, torque demand, air fuel ratio, MAP, etc. as well as fuel system conditions such as fuel levels in the common reservoir, first compartment, and second compartment of the fuel tank, lift pump operating parameters, etc. At 604, routine 600 monitors speeds of each of the first lift pump and the second lift pump. In one example, pump speeds may be estimated by monitoring current draw of each of the first lift pump and second lift pump at 606. In another example, pump speeds may be measured in a laboratory by variation of voltage at a power entry module (PEM) caused by commutation noise of the direct current (DC) motor.

At 608, routine 600 determines if current draw of either the first lift pump or the second lift pump is lower than a current draw threshold, Thr_CD. As mentioned earlier, a speed of a lift pump may increase at lower fuel levels. As such, the increase in the speed of the lift pump (e.g., of either lift pump) may be determined by noting reduced current draw by the lift pump.

If current draw by either lift pump is at or higher than the current draw threshold, routine 600 proceeds to 610 to maintain lift pump operation as well as engine operation. Routine 600 then ends. Alternatively, if it is determined at 608 that current draw of either the first lift pump or the second lift pump is lower than a current draw threshold, Thr_CD, routine 600 continues to 612 to deactivate one of the first lift pump and the second lift pump situated within the common reservoir. The lift pump that is not disabled is maintained active. As in routine 500, the lift pump to be disabled may be determined in routine 700 of FIGS. 7A and 7B. Further, at 614, routine 600 continues to supply fuel to the DI pump via the lift pump that is maintained active. Thus, the engine continues to operate albeit with lower power and reduced torque production.

In response to the reduced fuel flow from the lift pumps, at 616, routine 600 modifies a transmission shift schedule based on engine operation at the reduced fuel flow rate (as one lift pump of the two lift pumps is disabled and shut down). For example, the transmission may be upshifted. In another example, instead of modifying transmission schedule, the controller may command a lower fuel flow rate. Further, at 618, an operator of the vehicle is notified that fuel levels are low and torque production of the engine may thereby be lower. Furthermore, at 620, the disabled lift pump is reactivated upon determining that the fuel tank has been refueled. As such, the disabled lift pump may be reactivated only after a key-off event and detection of the refueling event. As in routine 500, it may be determined that a refueling event has occurred based on an opening of a refueling lock. In another example, the refueling event may be confirmed when fuel levels in the fuel tank (and the various compartments) are above a fuel level threshold. Routine 600 then ends.

Herein, current draw and lift pump speed may be used to determine whether the fuel fills in the fuel tank, and the common reservoir in the fuel tank, are lower than the fuel fill threshold.

Figure 7A:
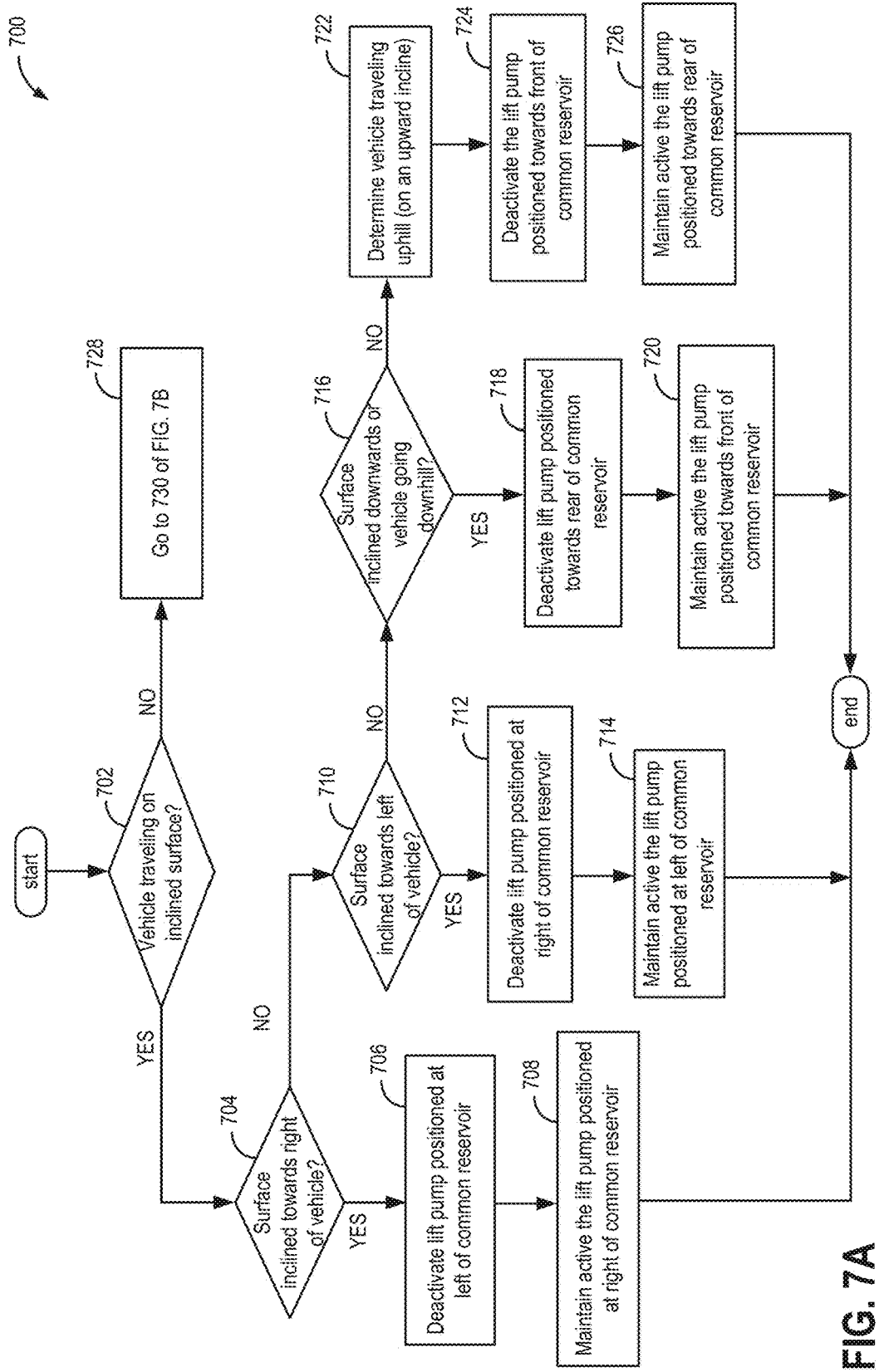
FIGS. 7A and 7B present an example flow chart with a routine for selecting one of the two lift pumps to be disabled.
Figure 7B:
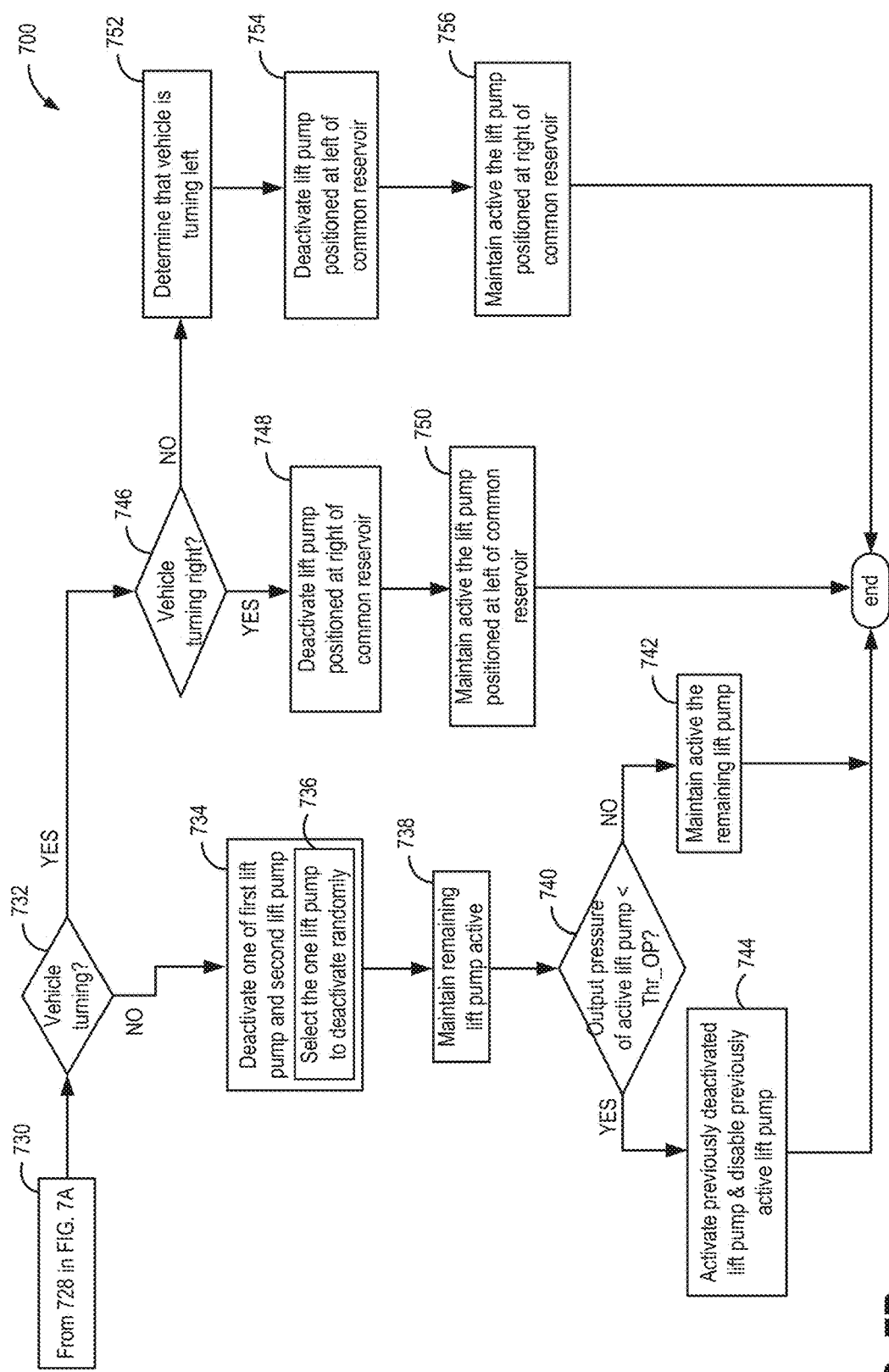
Figure 8:
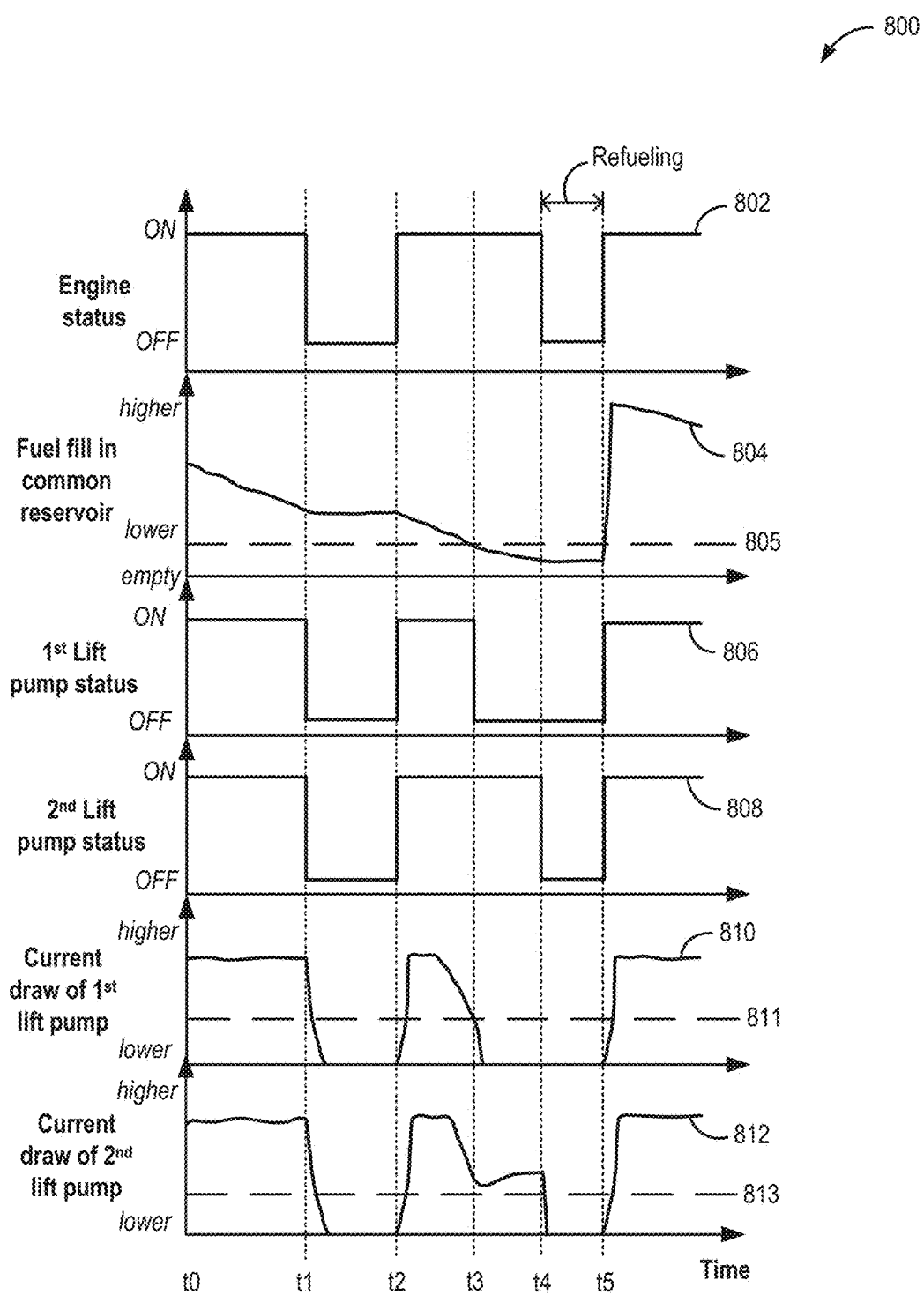
FIG. 8 is an example operation depicting deactivating both or one of the two lift pumps based on engine conditions and fuel system conditions.

FIGS. 7A and 7B portray an example routine 700 that determines which of the two lift pumps is to be shut down when fuel fill in the common reservoir of the fuel tank is determined to be lower than a fuel fill threshold, Thr_fill. Specifically, routine 700 may be activated in routines 500 and/or 600 to select the lift pump that will be deactivated. Routine 700 will be described in relation to the example system shown in FIG. 1 and the example schematic illustrations of FIGS. 2A, 2B, 3A, 3B, 4A, and 4B. However, it should be understood that similar routines may be used with other systems without departing from the scope of this disclosure. Instructions for carrying out routine 700 included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system, such as the actuators of FIG. 1 to adjust engine operation, according to the routines described below.

At 702, routine 700 determines if a vehicle, such as vehicle 6, is traveling on an inclined surface. As an example, the vehicle may be traveling upward on an uphill road. In another example, the vehicle may be driven on a track which is inclined towards a left side of the vehicle. As such, a gradient and/or tilt of the vehicle may be determined by an inclinometer. If it is determined that the vehicle is not raveling on an inclined surface, but is traveling on a relatively level surface, routine 700 continues to 728 to progress to 730 of FIG. 7B.

However, if it is confirmed that the vehicle is traveling on an inclined surface, routine 700 proceeds to 704 to determine if the surface is inclined towards a right side of the vehicle. Referring to FIG. 3B, vehicle 6 in schematic illustration 350 is depicted as traveling on a surface that is inclined to the right side 204 of vehicle 6. If yes, routine 700 continues to 706 to deactivate the lift pump that is located towards a left side of the common reservoir.

If the vehicle is traveling on a surface inclined towards the right of the vehicle, fuel in the fuel tank (and in the common reservoir) may shift towards the right side of the vehicle and the fuel tank. Specifically, fuel in the common reservoir may travel towards the right side of the common reservoir. Thus, the lift pump situated towards the left side of the common reservoir may encounter fuel starvation at low fuel fills, and therefore may be deactivated. In other words, the lift pump that is situated in a direction opposite to the direction of inclination may be selected for deactivation. Further, at 708, the lift pump positioned towards the right side of the common reservoir (and the fuel tank) and that is closer to the right side of the vehicle is maintained active. To elaborate, the lift pump that is positioned towards the direction of incline may be maintained active. Routine 700 then ends.

Returning to 704, if it is determined that the surface that the vehicle is traveling on is not inclined to the right side of the vehicle, routine 700 progresses to 710. At 710, routine 700 determines if the surface that the vehicle is traveling on is inclined to the left side of the vehicle. Referring to FIG. 3A, vehicle 6 in schematic illustration 300 is traveling on a surface that is inclined to the left side 206 of vehicle 6. If yes, routine 700 continues to 712 to deactivate the lift pump that is located towards the right side of the common reservoir.

If the vehicle is traveling on a surface inclined towards the left of the vehicle, fuel in the fuel tank (and in the common reservoir) may shift towards the left side of the vehicle and the left side of fuel tank (and the left side of the common reservoir). Thus, the lift pump situated towards the right side of the common reservoir (closer to the right side of the vehicle) may encounter fuel starvation at low fuel fills in the common reservoir and therefore may be deactivated. In the schematic illustration 300 of FIG. 3A, second lift pump 40 that is positioned towards the right side 204 of vehicle 6 (and closer to right side 222 of common reservoir 26) may encounter fuel starvation as fuel levels increase towards the left side 220 of common reservoir 26. Accordingly, second lift pump 40 may be deactivated. In other words, the lift pump that is situated in a direction opposite to the direction of inclination may be selected for deactivation.

Further, at 714, the lift pump positioned towards the left side of the common reservoir (and the fuel tank) and that is closer to the left side of the vehicle is maintained active. In the schematic illustration 300 of FIG. 3A, first lift pump 20 positioned towards the left side 206 of vehicle 6 (and closer to left side 220 of common reservoir 26) may be maintained active. To elaborate, the lift pump that is situated away from the direction of incline may be disabled by the controller when fuel fill in the reservoir is lower than the fuel fill threshold. In other words, the lift pump that is positioned towards the direction of incline may be maintained active. Routine 700 then ends.

Returning to 710, if it is determined that the surface that the vehicle is moving upon is not inclined to the left side of the vehicle, routine 700 continues to 716 to determine if the vehicle is traveling downhill. Specifically, it may be determined if the surface is inclined in a downward direction relative to a front end of the vehicle and the direction that the vehicle is traveling. As such, the vehicle may be descending on a downward slope. Referring to FIG. 4B, vehicle 6 in schematic illustration 450 is depicted as traveling on a downward slope that is inclined downwards relative to the front of vehicle 6. If yes, routine 700 progresses to 718 to select the lift pump that is positioned towards a rear of the common reservoir for deactivation. Specifically, the lift pump that is situated closer to the rear of the vehicle may be disabled.

If the vehicle is traveling on a downward incline, fuel in the common reservoir may shift towards a front end (e.g. front 414) of the common reservoir. Thus, the lift pump situated towards a rear of the common reservoir may encounter fuel starvation particularly at low fuel fills and therefore may be deactivated. In the schematic illustration 450 of FIG. 4B, second lift pump 40 that is positioned towards the rear 412 of common reservoir 26 may encounter fuel starvation as fuel levels increase towards the front 414 of common reservoir 26. Accordingly, second lift pump 40 may be deactivated. In other words, the lift pump that is situated in a direction opposite to the direction of vehicle travel down the incline may be selected for deactivation.

Further, at 720, the lift pump positioned towards the front of the common reservoir and that is closer to the front of the vehicle is maintained active. In the schematic illustration 450 of FIG. 4B, first lift pump 20 positioned towards front 414 of common reservoir 26 may be maintained active during lower fill levels when the vehicle is traveling downhill. In other words, the lift pump that is positioned ahead of the other lift pump within the common reservoir (relative to direction of vehicle travel) when the vehicle is travelling downhill may be maintained active. Routine 700 then ends.

Returning to 716, if it is confirmed that the surface is not inclined downwards, routine 700 proceeds to 722 to determine that the vehicle is traveling uphill. In other words, the vehicle may be ascending on an upward slope. Specifically, it may be determined that the surface is inclined in an upward direction relative to the front of the vehicle and direction that the vehicle is traveling. Referring to FIG. 4A, vehicle 6 in schematic illustration 400 is depicted as traveling uphill on a slope that is inclined upwards relative to the front of vehicle 6. Next, at 724, routine 700 deactivates the lift pump that is situated towards the front of the common reservoir. Specifically, the lift pump that is situated closer to the front of the vehicle may be disabled when the vehicle is travelling downhill.

If the vehicle is traveling on an upward incline, fuel in the common reservoir may accumulate towards a rear end (e.g., rear 412) of the common reservoir. Thus, the lift pump situated towards a front end (e.g., front 414) of the common reservoir may encounter fuel starvation at low fuel fills. Specifically, as described in reference to FIG. 4A, the lift pump that is situated towards the front of the common reservoir in the fuel tank may be deactivated. In the schematic illustration 400 of FIG. 4A, first lift pump 20 that is positioned towards the front 414 of common reservoir 26 may encounter fuel starvation as fuel levels increase towards the rear 412 of common reservoir 26. Accordingly, first lift pump 20 may be deactivated. In other words, the lift pump that is situated ahead of the other lift pump (in the direction of vehicle travel) within the common reservoir during vehicle travel up the incline may be selected for deactivation.

Further, at 726, the lift pump positioned towards the rear of the common reservoir and that is closer to the rear of the vehicle is maintained active. Since the lift pump situated towards the rear of the common reservoir may be sufficiently submerged in fuel, the lift pump towards the rear of the common reservoir may be maintained operational. In other words, the lift pump that is positioned in a direction opposite to the direction of vehicle travel up the incline may be maintained active. Routine 700 then ends.

Returning to 728, wherein after confirming that the vehicle is traveling on a reasonably level surface, routine 700 continues to 730 of routine 700 in FIG. 7B. At 730, routine 700 progresses to 732 of routine 700. At 732, routine 700 determines if the vehicle is turning. For example, the vehicle may be turning a corner at an intersection. In another example, the vehicle may be going around a curve. A wheel position sensor may determine if the vehicle is turning. Alternatively, a steering angle sensor may confirm that the vehicle is going around a curve. In yet other examples, a yaw rate sensor may be used. Other example embodiments may include different sensors to detect that the vehicle is turning without departing from the scope of this disclosure.

If it is confirmed that the vehicle is not turning, and is instead traveling in a substantially straight line, routine 700 continues to 734 to deactivate one of the first lift pump and the second lift pump. Specifically, at 736, routine 700 selects one of the first lift pump and the second lift pump for deactivation at random. Next, at 738, the remaining lift pump (e.g., the lift pump that is not selected) is maintained active. For example, if the first lift pump is randomly selected for deactivation at 736, the second lift pump may be maintained active and operational. In other words, electrical power to the first lift pump may be terminated while the second lift pump continues to receive electrical power. Further still, the second lift pump maintains a supply of fuel to the DI pump while the first fuel pump does not supply fuel to the DI pump. Next, at 740, routine 700 determines if an output pressure of the remaining active lift pump is lower than an output pressure threshold, Thr_OP. It will be noted that the output pressure of the remaining active lift pump may be substantially similar to a pressure at the inlet of the DI pump. As such, the pressure sensor, sensor 124 in common passage 79, may measure the output pressure of the active lift pump.

If it is determined that the output pressure of the remaining active lift pump is lower than Thr_OP, routine 700 continues to 744 where the previously deactivated lift pump is activated and the previously active lift pump is disabled. In the example cited above wherein the second lift pump is maintained active while the first lift pump is deactivated by random selection, if the output pressure of the second lift pump is lower than Thr_OP, the first lift pump may be activated by renewing supply of electrical power to the first lift pump. Further, the second lift pump is deactivated and shut down by terminating the supply of electrical power to the second lift pump. Routine 700 then ends.

However, if it is confirmed that the output pressure of the remaining active lift pump is not lower than Thr_OP, routine 700 continues to 742 to maintain operation of the remaining active lift pump. Herein, the previously disabled lift pump (at 734) may remain deactivated and shut down. Thus, in the example wherein the second lift pump is maintained active while the first lift pump is deactivated by random selection, if the output pressure of the second lift pump is not lower than Thr_OP, the second lift pump may be maintained operative and may receive electrical power while the first lift pump may remain inactive and shut down. Routine 700 then ends.

Thus, an example representation may include a method for a fuel system in a vehicle, comprising supplying fuel from a common reservoir via each of a first lift pump and a second lift pump, and responsive to fuel fill in the common reservoir lower than a threshold, disabling the first lift pump, and supplying fuel only via the second lift pump. The method may also include, if an output pressure of the second lift pump is lower than an output pressure threshold, activating the first lift pump and deactivating the second lift pump.

Returning to 732, if it is determined that the vehicle is turning or going around a curve, routine 700 proceeds to 746 to determine if the vehicle is turning right. For example, a steering wheel of the vehicle may be rotated by the operator in a clockwise direction to direct wheels of the vehicle into a right turn. If yes, routine 700 continues to 748 to deactivate the lift pump that is positioned towards the right side of the common reservoir. Referring to FIG. 2A wherein vehicle 6 in schematic illustration 200 is depicted as turning to the right, the second lift pump 40 positioned towards right side 222 of common reservoir 26 may be disabled when fuel fill in the common reservoir (and in the fuel tank) is determined to be lower than Thr_fill. As explained earlier, when a vehicle makes a turn to the right, fuel in the common reservoir moves towards the left side of the common reservoir. Accordingly, the lift pump situated towards the right side of the common reservoir may degrade as fuel levels towards the right side of the common reservoir become considerably lower. Thus, the lift pump located proximal the direction that the vehicle is turning (e.g., right) may be selected for deactivation.

Further, at 750, the lift pump positioned towards the left side of the common reservoir is maintained active and operational. To elaborate, the lift pump that is positioned away from the direction of that the vehicle is turning may be maintained active. Further still, the lift pump to be deactivated may be selected based on its proximity to the direction that the vehicle is turning. Routine 700 then ends.

If however it is determined at 746 that the vehicle is not turning towards the right, routine 700 progresses to 752 to determine that the vehicle is turning towards the left. In one example, the steering wheel of the vehicle may be rotated in an anti-clockwise direction by the operator to enable vehicle turn in the left direction. The vehicle may also be going around a curve that arcs to the left of the vehicle. Next, at 754, routine 700 selects the lift pump positioned to the left of the common reservoir for deactivation. Referring to FIG. 2B wherein vehicle 6 in schematic illustration 250 is depicted as turning to the left, the first lift pump 20 positioned towards left side 220 of common reservoir 26 may be disabled when fuel fill in the common reservoir (and in the fuel tank) is determined to be lower than Thr_fill. As explained earlier in reference to FIG. 2B, when a vehicle makes a turn to the left, fuel in the common reservoir moves towards the right side of the common reservoir. Accordingly, the lift pump situated towards the right side of the common reservoir may be submerged under sufficient fuel fill while the lift pump located towards the left side may not be surrounded by adequate fuel. Specifically, if the lift pump at the left side of the common reservoir continues to operate as the vehicle turns to the left (with lower fuel fills) it may have fuel starvation issues. Accordingly, the lift pump situated towards the left side of the common reservoir (and closer to the left side 206 of vehicle 6) may be disabled by the controller in response to fuel fill in the common reservoir being lower than Thr_fill. Thus, the lift pump located proximal the direction (e.g., left) that the vehicle is turning may be selected for deactivation.

Further, at 756, the lift pump positioned towards the right side of the common reservoir is maintained active and operational. To elaborate, the lift pump that is positioned away (or opposite) from the direction that the vehicle is turning may be maintained active. Further still, the lift pump to be deactivated may be selected based on its proximity to the direction that the vehicle is turning. Thus, if the vehicle is turning left, the lift pump closest to the left side of the common reservoir may be disabled. Conversely, if the vehicle is turning right, the lift pump that is positioned closer to the right side of the common reservoir may be selected for shut down. Routine 700 then ends.

Thus, an example method for a fuel system in a vehicle may comprise supplying fuel from a common reservoir via each of a first lift pump and a second lift pump, and responsive to fuel fill in the common reservoir lower than a threshold, disabling one of the first lift pump and the second lift pump, and supplying fuel only via a remaining lift pump. In the preceding example, the method may additionally or optionally further comprise if an output pressure of the remaining lift pump is lower than an output pressure threshold, activating previously disabled one of the first lift pump and the second lift pump, and deactivating the remaining lift pump. In any or all of the preceding examples, fuel supplied from the common reservoir via each of the first lift pump and the second lift pump may be additionally or optionally pumped to an inlet of a direct injection pump. In any or all of the preceding examples, the direct injection pump may additionally or optionally further supply the fuel to one or more direct injectors, each of the direct injectors fueling at least one cylinder of an engine. In any or all of the preceding examples, the method may additionally or optionally comprise, responsive to a pressure at an inlet of the direct injection pump being lower than a pressure threshold, deactivating the remaining lift pump, and ceasing supplying fuel to a direct injection pump. In any or all of the preceding examples, the method may additionally or optionally further include adjusting a transmission shift schedule in response to disabling one of the first lift pump and the second lift pump. In any or all of the preceding examples, the common reservoir may additionally or optionally be situated inside a fuel tank, wherein the common reservoir is filled with fuel from the fuel tank via one or more jet pumps. As in FIG. 1, the common reservoir 26 is situated within fuel tank 160, specifically within first compartment 78 of fuel tank 160. In any or all of the preceding examples, disabling one of the first lift pump and the second lift pump may additionally or optionally include selecting one of the first lift pump and the second lift pump based on whether the vehicle is turning in a specific direction, the selecting further based on a proximity of one of the first lift pump and the second lift pump to the specific direction within the common reservoir. In any or all of the preceding examples, disabling one of the first lift pump and the second lift pump may additionally or optionally include selecting one of the first lift pump and the second lift pump based on whether the vehicle is traveling on an incline.

FIG. 8 depicts an example map 800 illustrating adjustments to lift pump operation in an example fuel system of an engine, such as engine system 100 and fuel system 18 of FIG. 1, included in a vehicle, responsive to fuel fill being lower than a threshold. As such, map 800 will be described in relation to the system shown in FIG. 1. Map 800 depicts engine status at plot 802, fuel fill in a common reservoir, such as common reservoir 26 of FIG. 1, at plot 804, status of a first lift pump ($1^{st}$ lift pump) at plot 806, status of a second lift pump ($2^{nd}$ lift pump) at plot 808, current draw of the first lift pump at plot 810, and current draw of the second lift pump at plot 812. Line 805 represents the fuel fill threshold, Thr_fill, line 811 represents a current draw threshold for the first lift pump, and line 813 represents a current draw threshold for the second lift pump. As such, the current draw threshold for the first lift pump may be the same as the current draw threshold for the second lift pump, though represented as two separate lines. For example, the current draw threshold for each of the first lift pump and the second lift pump may be Thr_CD of FIG. 6. All plots are shown over time, along the x-axis. Further, time increases from the left of the x-axis towards the right. Note that elements aligning at a common time on the graph, such as at time t1, for example, are occurring concurrently.

Engine status may vary between one of "ON" and "OFF" wherein "ON" represents the engine being activated and combusting, and "OFF" represents the engine being shut down to rest. Similarly, the status of either lift pump can vary between either "ON" or "OFF" wherein "ON" indicates a status when the respective lift pump is activated and supplies fuel to a DI pump. As such, when at "ON", the corresponding lift pump may be receiving electrical power. Further, when the status of a lift pump is "OFF", the lift pump may be deactivated and shut down. Herein, the lift pump may not receive electrical power and may not pump fuel from the common reservoir to the DI pump.

Between t0 and t1, the engine of the vehicle may be "ON" such that it is combusting and activated. For example, the vehicle may be driven by an operator on city streets. Further, each of the first lift pump and the second lift pump may also be activated and may each be supplying fuel to the DI pump. Since each of the lift pumps is activated, current draw of the respective lift pumps may be higher. As the engine operates and combusts fuel, fuel level in the common reservoir decreases between t0 and t1.

At t1, the engine may be shut down to rest. For example, the operator may stop the vehicle at a first destination and key-off the engine. Accordingly, electrical power supply to each of the first lift pump and the second lift pump may be simultaneously terminated and each of the first lift pump and the second lift pump may be "OFF". Thus, current draw of each of the first lift pump and the second lift pump may decrease (to zero current draw at corresponding x-axis) at t1. Further, between t1 and t2, as the engine is "OFF", fuel fill in the common reservoir may remain the same as at t1, as fuel is not being drawn for combustion into the engine. Thus, during a first condition, each of the first lift pump and the second lift pump may be deactivated and shut down concurrently. The first condition may include an engine shut down to rest.

At t2, the engine may be activated during a key-on condition. Thus, at t2, the engine may be "ON" and may begin combusting fuel. For example, the operator may initiate an engine start and may begin driving the vehicle again. Accordingly, at t2 fuel fill in the common reservoir begins to decrease as the engine begins combustion. At the same time that the engine is activated at t2, each of the first lift pump and the second lift pump may be concurrently actuated such that each of the first lift pump and the second lift pump begin pumping fuel to the DI pump, and thereon to the engine for combustion. As such, at t2, each of the first lift pump and the second lift pump begins to draw electrical power and current draw for each of the first lift pump and the second lift pump increases.

At t3, fuel fill in the common reservoir decreases to below the fuel fill threshold (line 805). In response to the fuel fill falling below Thr_fill (line 805), one of the first lift pump and the second lift pump may be disabled. In the depicted example, the first lift pump is deactivated in response to the fuel fill being lower than line 805. For example, the first lift pump may be selected for deactivation randomly. In another example, with reference to FIG. 2B, it may be determined that the vehicle is turning to the left and the first lift pump 20 is deactivated as fuel levels decrease towards the left side of the common reservoir. It will be appreciated that in an alternative example the second lift pump may be selected for deactivation at t3 while the first lift pump is maintained active.

As another example, the current draw of the first lift pump decreases to below the corresponding current draw threshold (line 811) at t3. As shown in FIG. 8, current draw for each of the first lift pump and the second lift pump decreases between t2 and t3. For example, due to lower fuel fill in the common reservoir, each of the first lift pump and the second lift pump may speed up as fuel vapor is ingested along with liquid fuel. The increase in speeds of the first lift pump and the second lift pump may be indicated by the respective decreases in current draw. Since current draw of the first lift pump reduces to the current draw threshold at t3, the first lift pump may be disabled.

Thus, in an example representation, a method for a fuel system in an engine may comprise supplying fuel from a common reservoir to a direct injection pump via each of a first lift pump and a second lift pump, and responsive to a current draw of the first lift pump lower than a threshold current draw, deactivating the first lift pump, and supplying fuel only via the second lift pump.

Further, at t3, the second lift pump may be maintained active and "ON" (plot 808) to supply fuel to the DI pump and the engine. Thus, the engine may continue to operate even after the first lift pump is disabled. Further still, as the engine continues to operate between t3 and t4, fuel fill may continue to decrease but at a slower rate. As the first lift pump is disabled, the current draw of the first lift pump reduces sharply (e.g., to zero current draw) while current draw of the second lift pump may increase slightly as shown in plot 812 between t3 and t4. Thus, during a second condition, the first lift pump may be deactivated while continuing to supply fuel to the DI engine via the second lift pump. The second condition may include fuel fill in the common reservoir declining below the fuel fill threshold while the engine is not shut down. The second condition, in an alternative example, may include a current draw of either the first lift pump or the second lift pump being lower than a current draw threshold, and the engine not being shut down.

At t4, the engine may be shut down to rest by the operator initiating a key-off condition, and consequently the second lift pump is also deactivated due to a lack of electrical power supply. For example, the engine may be shut down to rest for a refueling event. The refueling event may occur between t4 and t5 and the fuel tank may be filled. At t5, an engine start occurs and each of the first lift pump and the second lift pump are activated (plots 806 and 808). Thus, in response to the refueling event, the previously disabled lift pump may be activated in addition to actuating the previously active lift pump. Upon activation of both lift pumps, jet pumps within the common reservoir may be operated to fill the common reservoir with fuel. Accordingly, fuel fill in the common reservoir increases at and immediately after t5. Once the fuel fill in the common reservoir attains a desired level, the jet pumps may be deactivated and fuel fill begins decreasing as fuel is supplied to the engine for combustion (plot 804). As the two lift pumps are actuated at t5, current draw for each of the first lift pump and the second lift pump may be higher as shown.

An example vehicle system may comprise an engine, a transmission, a fuel tank comprising a reservoir (such as common reservoir 26 of FIG. 1), the reservoir situated within a compartment (such as first compartment 78 of fuel tank 160 in FIG. 1) of the fuel tank, a fuel level sensor in the reservoir measuring fuel level within the reservoir, a first lift pump and a second lift pump positioned within the reservoir, each of the first lift pump and the second lift pump being electrically actuated, and each of the first lift pump and the second lift pump pumping fuel from the reservoir, and a direct injection pump receiving fuel from each of the first lift pump and the second lift pump.

In the preceding example, the example vehicle system may additionally or optionally also include a controller with computer readable instructions stored in non-transitory memory for during a first condition, deactivating each of the first lift pump and the second lift pump concurrently, and terminating fuel supply to the direct injection pump. In any or all of the preceding examples, the controller may also additionally or optionally include instructions for during a second condition, deactivating the first lift pump, and continuing fuel supply to the direct injection pump. In any or all of the preceding examples, the first condition may additionally or optionally include an engine shut down, the engine shut down to rest, and the second condition may additionally or optionally include fuel level in the reservoir being lower than a fill threshold and the engine not being shut down. As such, during the second condition, the engine may continue to operate. In any or all of the preceding examples, the first condition may additionally or optionally include an engine shut down, the engine shut down to rest, and the second condition may additionally or optionally include a current draw of either the first lift pump or the second lift pump being lower than a current threshold and the engine not being shut down. In any or all of the preceding examples, the controller may additionally or optionally comprise further instructions for during the second condition, maintaining the second lift pump activated to continue fuel supply to the direct injection pump. In any or all of the preceding examples, the controller may additionally or optionally include further instructions for during the second condition, adjusting a transmission shift schedule in response to deactivating the first lift pump. The transmission shift schedule may be modified based on the reduced torque being produced by the engine after deactivating the first lift pump.

Figure 9A:
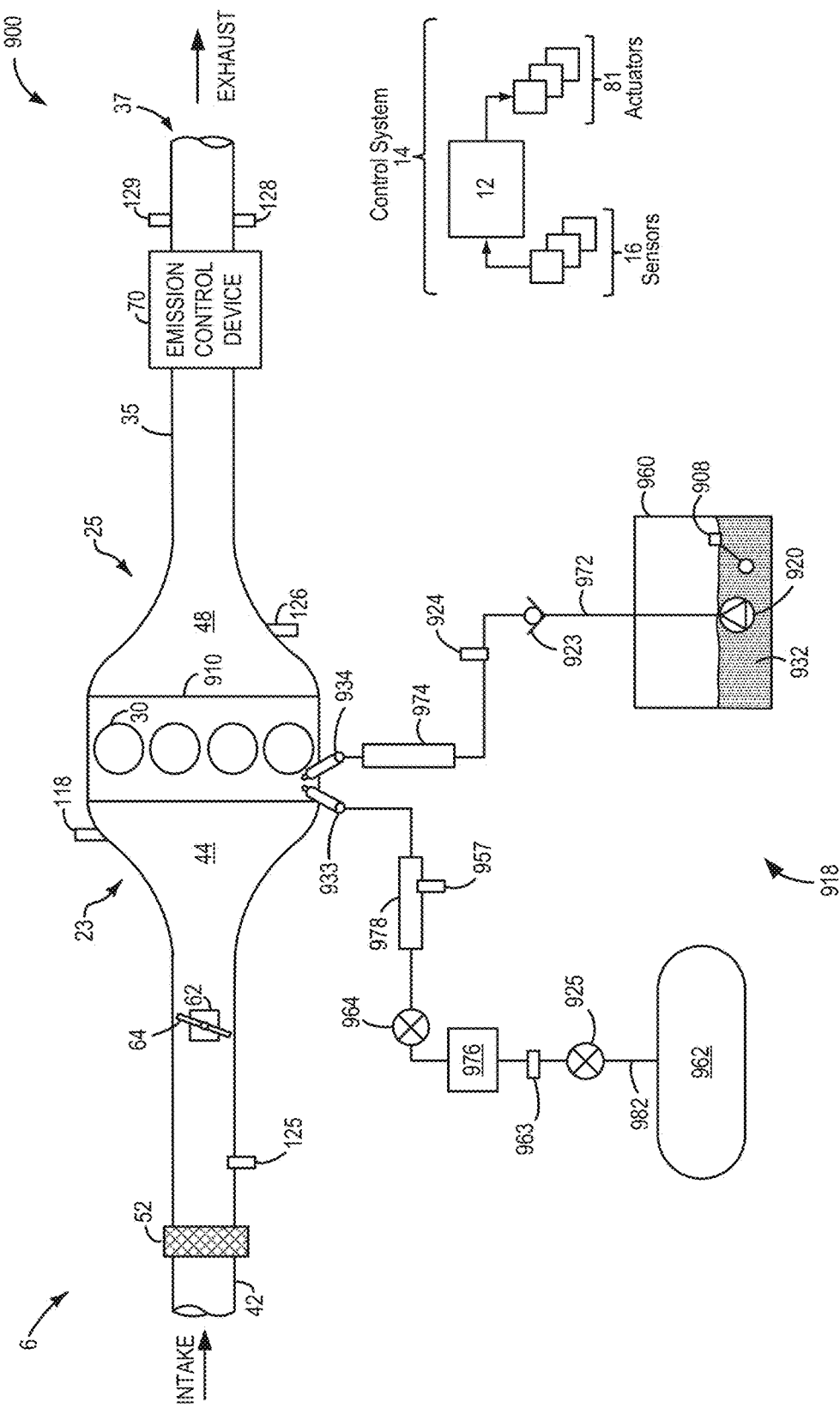
FIGS. 9A and 9B portray schematically example embodiments of a bi-fuel engine.

Turning now to FIG. 9A, it presents a schematic depiction of engine system 900 coupled in vehicle system 6 of FIG. 1. As such, engine system 900 includes several components previously introduced in FIG. 1. Accordingly, these similar components are numbered the same as in FIG. 1 and will not be re-introduced. Further, the canister 22 and associated components are not presented in FIG. 9A for the sake of simplicity.

Engine system 900 includes bi-fuel engine 910 with a plurality of cylinders 30 that may be fueled by one or more fuels. As such, engine system 900 may also be a multi-fuel system wherein cylinders 30 are fueled by one or more of a plurality of fuels. Fuel system 918 may include one or more fuel tanks. In the depicted example, the fuel system 918 is a multi-fuel system including a first fuel tank 962 configured to store a first fuel having a first chemical and physical property. Fuel system 918 also includes a second fuel tank 960 configured to store a second fuel having a second, different chemical and physical property. Fuel tanks 962 and 960 may hold a plurality of fuel or fuel blends. In the depicted example, the first fuel stored in first fuel tank 962 may be a first gaseous fuel, such as compressed natural gas (CNG). In another example, the first gaseous fuel may be liquefied petroleum gas (LPG). The second fuel stored in second fuel tank 960 in the depicted example may be a second liquid fuel, such as gasoline. Alternatively, the second liquid fuel may also include fuel with a range of alcohol concentrations, various gasoline-ethanol fuel blends (e.g., E10, E85), and combinations thereof.

First fuel tank 962 may store the first gaseous fuel under pressure and thus, may not include a pump. First fuel tank 962 may be fluidically coupled to a pressure regulator 976 and a solenoid valve 964 along fuel line 982 to enable a fixed low pressure supply of the first gaseous fuel to be provided to fuel injector 933. A tank outlet valve 925 (e.g., a check valve) may be positioned between first fuel tank 962 and pressure regulator 976 to ensure correct flow of fuel from the first fuel tank. A tank output line pressure sensor (or simply, pressure sensor 963) may be coupled in fuel line 982 between pressure regulator 976 and tank outlet valve 925 (e.g., upstream of pressure regulator 976 and downstream of tank outlet valve 925) to provide an estimate of fuel pressure before pressure regulation by the pressure regulator 976. In one example, pressure sensor 963 may provide an estimate of fuel pressure input on the higher pressure side of pressure regulator 976.

Fuel may be delivered from first fuel tank 962 to fuel injector 933 of bi-fuel engine 910 via fuel line 982. Specifically, fuel from first fuel tank 962 may be delivered to first fuel rail 978, and thereon supplied to fuel injector 933. Fuel injector 933 is depicted as a port injector configured to deliver the first gaseous fuel into intake manifold 44 upstream of the cylinders 30. Fuel rail pressure sensor 957 may be coupled to first fuel rail 978 to monitor fuel rail pressure (FRP) within first fuel rail 978. As such, a lower FRP may indicate that the first gaseous fuel in first fuel tank 962 is depleted.

Second fuel tank 960 may include a lower pressure pump 920 (also termed lift pump 920) situated within the second fuel tank 960 submerged within second fuel 932. A fuel level sensor 908 is located within the second fuel tank 960 to measure fuel level within the second fuel tank and provide an indication of a fuel fill level to controller 12. Lift pump 920 may pressurize second liquid fuel before delivering the second liquid fuel to example fuel injector 934 coupled to bi-fuel engine 910. Fuel injector 934 is also configured to deliver the second liquid fuel into intake manifold 44 (as port injection) upstream of cylinders 30. Thus, each fuel may be delivered to bi-fuel engine 910 via a distinct and separate fuel injector (and via distinct and separate fuel lines and components). Specifically, the first gaseous fuel may be introduced into intake manifold 44 via fuel injector 933 while the second liquid fuel may be injected into the intake manifold 44 via fuel injector 934. Further, in the depicted example of FIG. 9A, each of the fuel injectors is a port injector. Additional port injectors for supplying the first gaseous fuel and the second liquid fuel to bi-fuel engine 910 may be provided, though not depicted in FIG. 9A.

Fuel injector 934 may receive second liquid fuel via second fuel rail 974 fluidically coupled to fuel line 972. Check valve 923 may be positioned between second fuel rail 974 and lift pump 920 to allow fluid flow from the lift pump 920 to second fuel rail 974 and block fluid flow from second fuel rail 974 to lift pump 920. Further, pressure sensor 924 may be coupled to fuel line 972 between check valve 923 and second fuel rail 974 to detect a pressure of fuel being delivered to second fuel rail 974. In one example, pressure sensor 924 may also provide a signal of fuel rail pressure within second fuel rail 974.

Figure 9B:
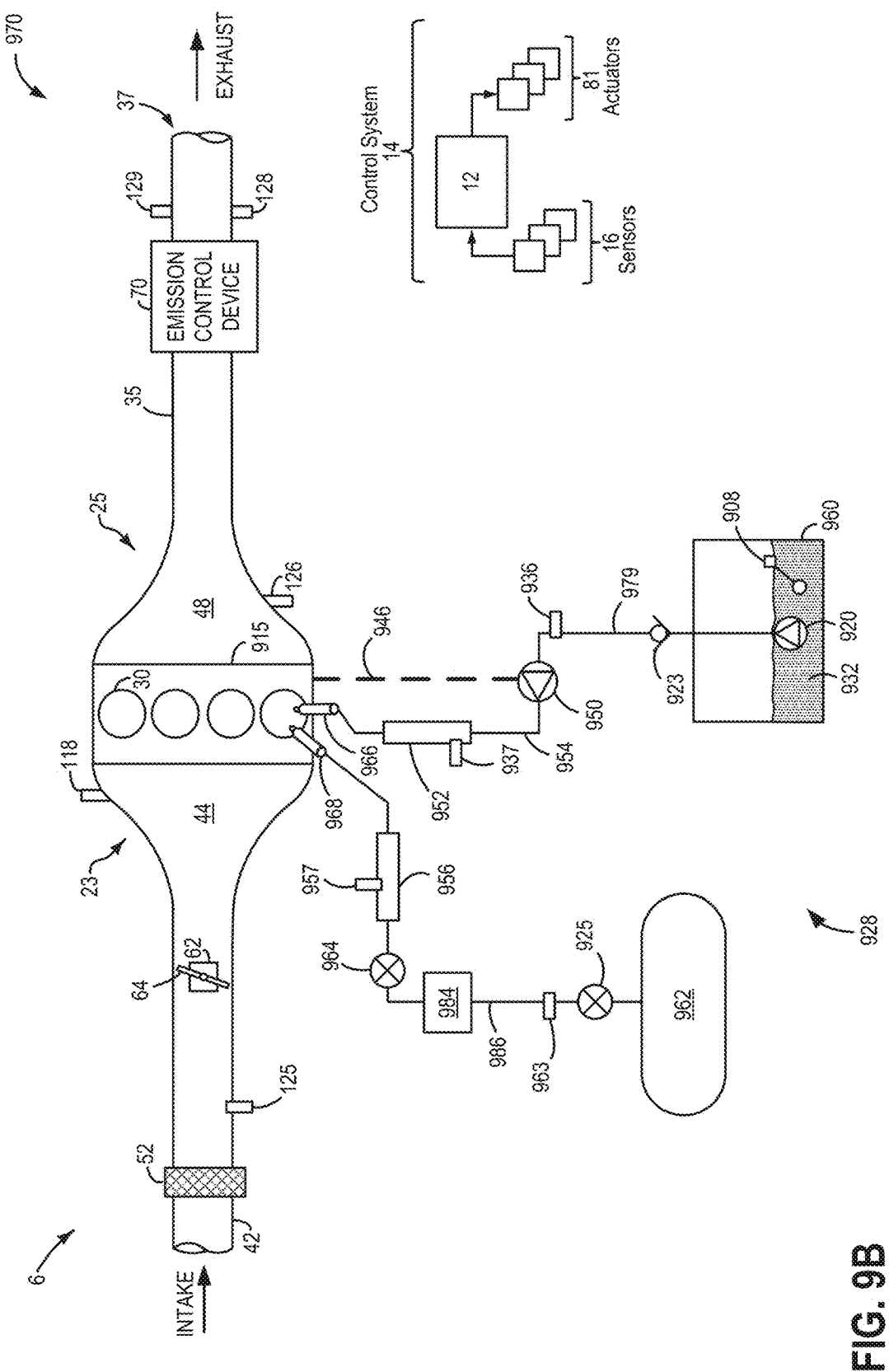

FIG. 9B depicts engine system 970 coupled to fuel system 928 in another embodiment of vehicle 6. As such, multiple components of FIG. 9B are similar to those introduced in FIG. 9A. These similar components are numbered the same as in FIG. 9A and not re-introduced. One primary difference between engine system 970 and fuel system 928 of FIG. 9B and engine system 900 and fuel system 918 of FIG. 9A is that the fuel injectors supplying fuel to bi-fuel engine 915 of engine system 970 are direct injectors, and not port injectors as in FIG. 9A. It will be noted that each of engine system 900 and engine system 970 is coupled communicatively to a control system 14 with a controller 12 similar to engine system 100 of FIG. 1.

Accordingly, the first gaseous fuel may be delivered from first fuel tank 960 to direct injector 968 via direct injector fuel rail 956. First gaseous fuel may be delivered along fuel line 986 and past check valve 925 into pressure regulator 984. Pressure regulator 984 may regulate the pressure of the first gaseous fuel and along with solenoid valve 964 may deliver the first gaseous fuel at a higher pressure and fixed rate to direct injector 968. As such, FRP sensor 957 coupled to direct injector fuel rail 956 may estimate FRP of direct injector fuel rail 956.

Further, engine system 970 also includes a direct injection pump for providing the second liquid fuel to a direct injector at higher pressures. Accordingly, second liquid fuel 932 may be delivered from lift pump 920 to direct injection (DI) pump 950 along passage 979. Pressure sensor 936 measures fuel pressure within passage 979. As such, pressure sensor 936 may estimate fuel pressure at an inlet of DI pump 950. Check valve 923 in passage 979 may allow fuel flow along passage 979 in a direction towards DI pump 950 and may block fuel flow from DI pump 950 towards lift pump 920. Fuel delivered to the inlet of DI pump 950 may be pressurized to a higher pressure (relative to output pressure of lift pump 920) by the DI pump and delivered to direct injector 966 via fuel line 954 and direct injector fuel rail 952. Pressure sensor 937 may monitor fuel rail pressure within direct injector fuel rail 952. The DI pump 950, as DI pump 50 of FIG. 1, is an engine driven pump while lift pump 920 is actuated via electrical power. As shown in FIG. 9B, DI pump 950 may be coupled to bi-fuel engine 915 via coupling 946.

It will be noted that each of the plurality of cylinders 30 of bi-fuel engine 915 may be fueled by corresponding direct injectors though not specifically depicted in FIG. 9B. Further, the first gaseous fuel and the second liquid fuel are supplied to each cylinder of bi-fuel engine 915 via separate and distinct direct injectors. In alternative examples, bi-fuel engines may receive the first gaseous fuel as port injections while receiving the second liquid fuel as direct injections. In yet other examples, bi-fuel engines may receive the first gaseous fuel as direct injections while receiving the second liquid fuel as port injections.

Bi-fuel engines 910 and 915 may operate with one fuel or both fuels based on operating conditions. In one example, the bi-fuel engine may be fueled by the first gaseous fuel alone, while in another example, the bi-fuel engine may be fueled by the second liquid fuel alone. In yet another example, the bi-fuel engine may be fueled by a combination of the first gaseous fuel and the second liquid fuel. During engine operation with both fuels (e.g., when both fuels are delivered to the bi-fuel engine at the same time), if a fuel fill of the second liquid fuel decreases to lower than a fill threshold, the lift pump situated within the second fuel tank (e.g., lift pump 920) may undergo degradation due to fuel starvation. In order to reduce such degradation of the lift pump, a controller of the bi-fuel engine may deactivate the lift pump in response to fuel fill in the second fuel tank decreasing below the fill threshold. It will be appreciated that the fill threshold for the second liquid fuel in the fuel systems 918 and 928 may be different and dissimilar to the fuel fill threshold, Thr_fill, of fuel system 18 of FIG. 1.

Figure 10A:
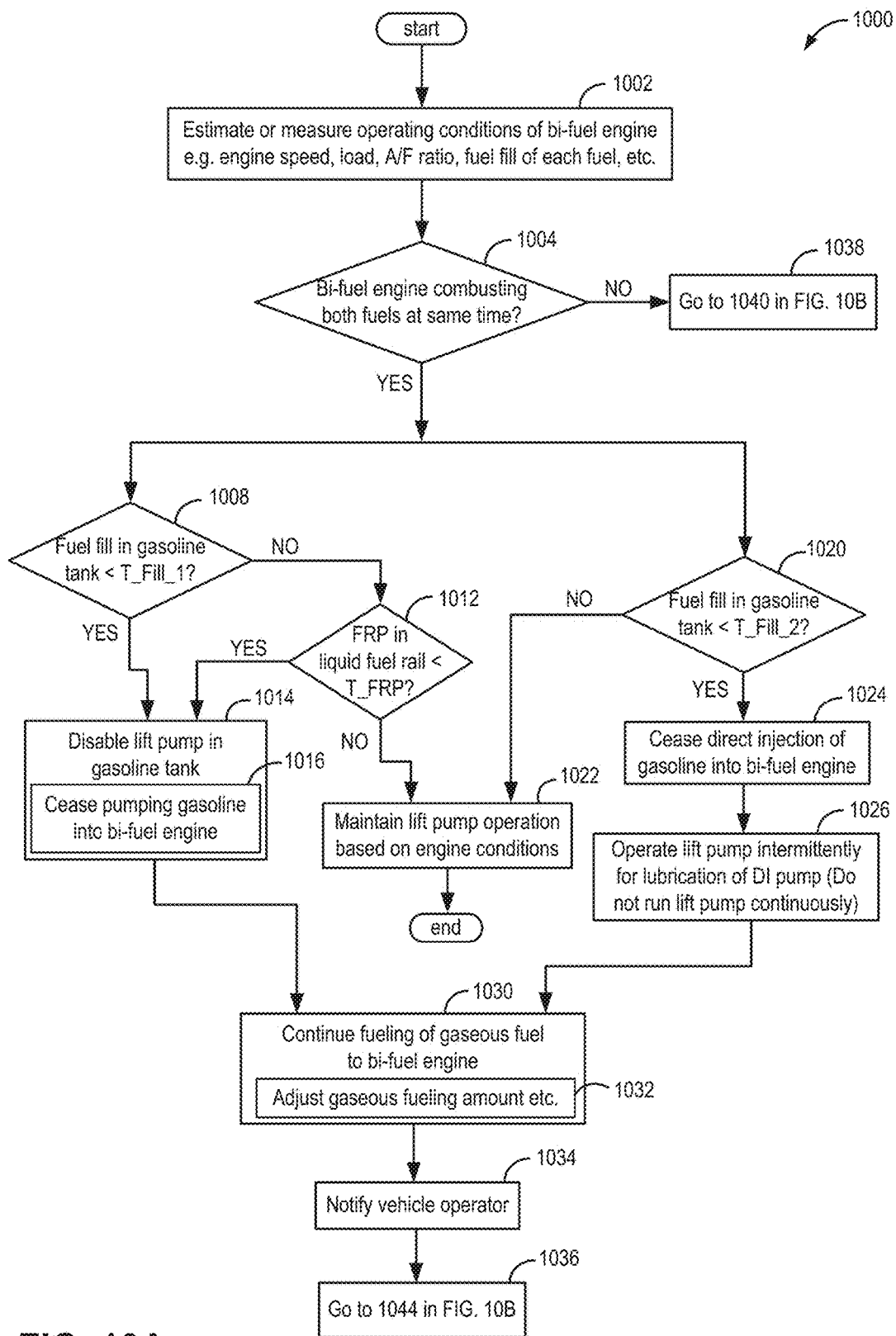
FIGS. 10A and 10B present an example flow chart including a routine for operating the bi-fuel engine when a level of liquid fuel supplying the bi-fuel engine is lower than a fuel fill threshold.
Figure 10B:
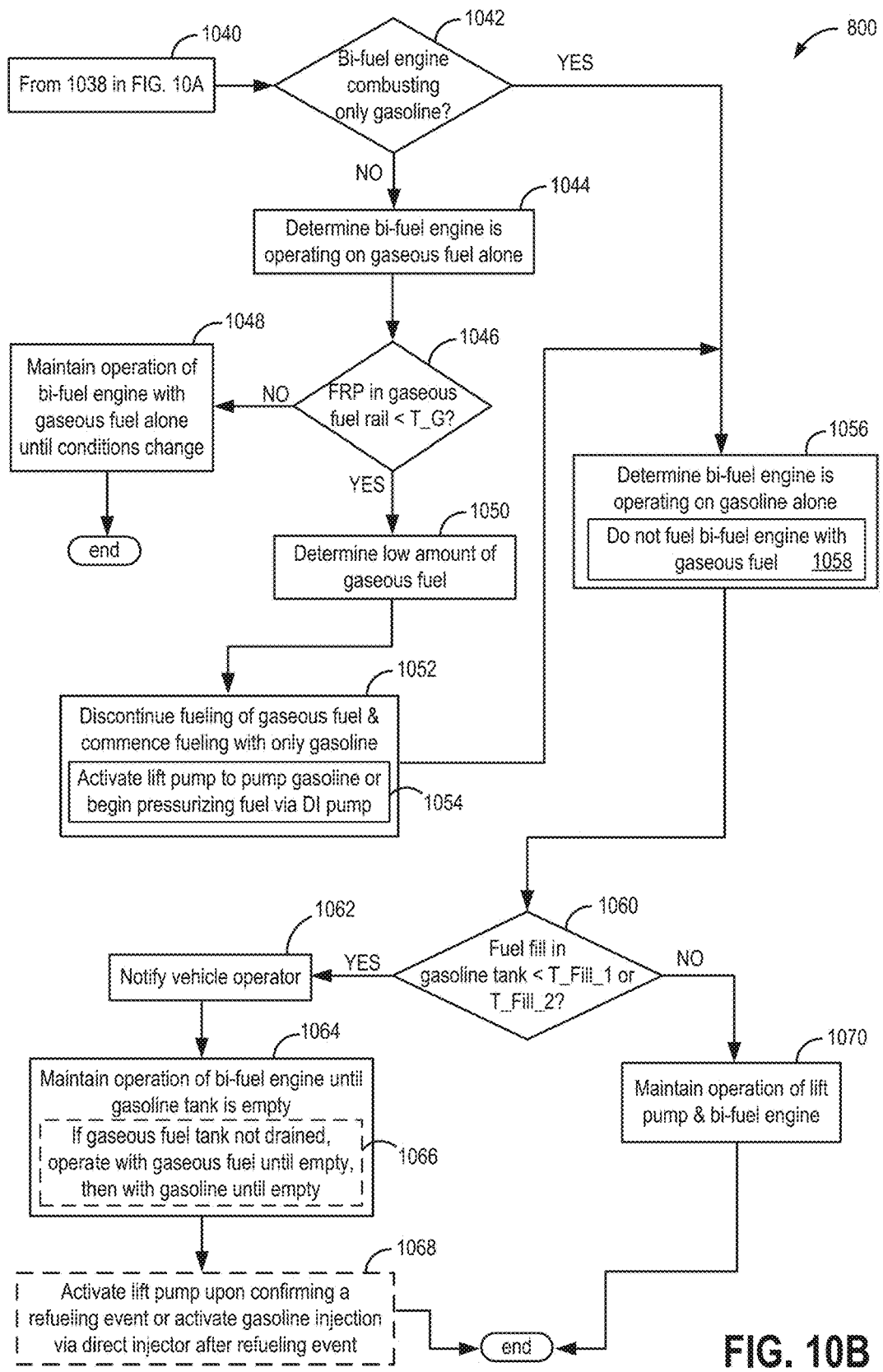

FIGS. 10A and 10B depict an example routine 1000 for controlling lift pump operation when fuel fill levels of the second liquid fuel are lower than the fill threshold. Specifically, the lift pump pressurizing the second liquid fuel may be deactivated and shut down in the example of engine system 900 while in the example of engine system 970, the lift pump may be operated only for lubrication of the DI pump. Specifically, the DI pump may operate in a mechanical mode wherein fuel is not supplied at a higher pressure to the direct injector fuel rail. As such, routine 1000 is described assuming that the second liquid fuel is gasoline residing in a gasoline tank. Other examples may include liquid fuels distinct from gasoline without departing from the scope of this disclosure.

Routine 1000 will be described in relation to each of example engine systems 900 and 970 of FIGS. 9A and 9B respectively. However, it should be understood that similar routines may be used with other systems without departing from the scope of this disclosure. Instructions for carrying out routine 1000 included herein may be executed by a controller, such as controller 12 of FIGS. 9A and 9B, based on instructions stored on a memory of the controller and in conjunction with signals received from sensors of the engine system, such as the sensors described above with reference to FIGS. 9A and 9B. The controller may employ engine actuators of the engine system, such as the actuators of FIGS. 9A and 9B to adjust engine operation, according to the routines described below.

At 1002, engine operating conditions are estimated and/or measured. For example, engine conditions may be engine speed, engine load, air fuel ratio, MAF, MAP, etc. In addition to engine conditions, routine 1000 also estimates and/or measures fuel system conditions such as fuel fills of each fuel (e.g., fuel fill of the first gaseous fuel, fuel fill of the second liquid fuel), fuel rail pressure for each fuel, etc. Next, at 1004, routine 1000 determines if the bi-fuel engine is combusting both fuels at the same time. As an example, the bi-fuel engine may receive a supply of each fuel into each cylinder for combustion concurrently via the separate fuel injectors. If it is confirmed that the bi-fuel engine is using both fuels together, routine 1000 progresses to 1008 if the second liquid fuel, e.g., gasoline, is port injected. For example, the bi-fuel engine may include port injectors for delivering the second liquid fuel into the intake manifold upstream of each cylinder, as shown in FIG. 9A. As described in reference to FIG. 9A, when the second liquid fuel is port injected into bi-fuel engine 910, the second liquid fuel is pressurized solely by the lift pump. On the other hand, if the second liquid fuel is direct injected (as in, the bi-fuel engine is coupled to a DI pump), routine 1000 continues to 1020, which will be described further below.

In the embodiment of the bi-fuel engine which does not include the DI pump, e.g., the embodiment of FIG. 9A, routine 1000 progresses to 1008 to confirm if fuel fill in the second fuel tank (e.g., gasoline tank) is lower than a fill threshold, T_Fill_1. As mentioned earlier, the fill threshold for the fuel system coupled to the bi-fuel engine 910 of FIG. 9A may be different from the fuel fill threshold of the fuel system with dual lift pumps. For example, T_Fill_1 may be 13% of the volume of the second fuel tank. In another example, the fill threshold may be 5%. Alternatively, the fill threshold for the fuel system coupled to the bi-fuel engine 910 of FIG. 9A may be the same as the fuel fill threshold for the fuel system of FIG. 1.

If the fuel level in the gasoline tank is at or higher than the fill threshold, T_Fill_1, routine 1000 proceeds to 1012 to determine if fuel rail pressure in the fuel rail containing gasoline is lower than a threshold fuel rail pressure, T_FRP. The threshold fuel rail pressure may be a desired fuel rail pressure for engine operation. Alternatively, the routine may determine if the pressure in the fuel rail containing gasoline does not attain a desired fuel rail pressure. Herein, the lift pump may not be pressurizing the fuel rail sufficiently due to a drop in fuel fill within the gasoline tank. If yes, routine 1000 continues to 1014 to deactivate the lift pump within the gasoline tank. If no, routine 1000 progresses to 1022 to maintain lift pump operation based on existing engine conditions. Routine 1000 then ends.

As such, 1008 in routine 1000 may be optional and routine 1000 may progress from 1006 to 1012 instead of determining fuel fill level at 1008. However, by performing the check for fuel fill level at 1008, the lift pump may be disabled in response to an increased likelihood of the lift pump drawing in vapor and/or air instead of liquid fuel.

Returning to 1008, if the fuel fill in the gasoline tank is lower than T_Fill_1, routine 1000 continues to 1014 to disable the lift pump situated within the second fuel tank (or gasoline tank). Specifically, electrical power to the lift pump may be ceased by deactivating power supply to the lift pump. The controller may communicate a signal to terminate electrical supply to the lift pump. Further, at 1016, fueling of the bi-fuel engine with the second liquid fuel may be stopped. As the lift pump operation is terminated, gasoline may not be pumped into the second fuel rail and therefore, the port injector may not inject any liquid fuel into the intake manifold of bi-fuel engine 910. Consequently, at 1030, the bi-fuel engine is now fueled via the gaseous fuel alone. Specifically, the bi-fuel engine may now combust only the first gaseous fuel. Furthermore, at 1032, the fueling amount of the first gaseous fuel may be adjusted to provide the desired torque via gaseous combustion alone. As such, an operator of the vehicle is notified at 1034 of the low fuel fill in the gasoline tank. Routine 1000 then proceeds to 1044 of FIG. 10B which will be described further below.

Returning to 1004, if the second liquid fuel is direct injected (as in FIG. 9B), routine 1000 continues to 1020. As such, the bi-fuel engine may be bi-fuel engine 915 of engine system 970 in FIG. 9B. Next, at 1020, routine 1000 confirms if the fuel fill in the gasoline tank is lower than the fill threshold, T_Fill_2. It will be appreciated that the fill threshold for the second fuel tank in fuel system 928 may be different from the fill threshold in the second fuel tank in fuel system 918. As an example, the fill threshold for the second fuel tank in FIG. 9B may be 15% of the tank volume. Alternatively, T_Fill_2 may be 10% of the volume of the second fuel tank. As such, the fill threshold, T_Fill_2, for the second fuel tank in fuel system 928 of FIG. 9B may be higher than the fill threshold, T_Fill_1, for the second fuel tank in fuel system 918 of FIG. 9A. Alternatively, the fill threshold for the second fuel tank in FIG. 9B may be the same as the fill threshold, T_Fill_1.

If, at 1020 it is confirmed that the fuel fill in the gasoline tank is higher than T_Fill_2, routine 1000 proceeds to 1022 to maintain lift pump operation based on existing engine conditions. However, if the fuel fill within the gasoline tank is lower than the fill threshold T_Fill_2, routine 1000 continues to 1024 to cease injecting gasoline (or the second liquid fuel) into the bi-fuel engine. Specifically, the DI pump may be commanded to pressurize the second liquid fuel to a lower pressure. As an example, a solenoid spill valve at an inlet of a compression chamber of the DI pump may be commanded to a fully open state during a substantial portion of a compression stroke in the DI pump. Accordingly, the second liquid fuel entering the compression chamber is not pressurized to a higher pressure by a piston of the DI pump. As such, the second liquid fuel received from the lift pump may be at a pressure that is lower than fuel rail pressure within the direct injector fuel rail 952. Accordingly, fresh fuel may not enter the direct injector fuel rail. Thus, injection of the second liquid fuel into the bi-fuel engine may be terminated as the direct injector fuel rail may not receive additional fuel from the DI pump.

Next, at 1026, the lift pump is operated intermittently only for lubrication of the engine driven DI pump. As such, the lift pump may not be operated based on engine conditions. Specifically, the lift pump is not continuously operated. To elaborate, electrical power may be supplied to the lift pump sporadically based on a pressure at an inlet of the DI pump.

The DI pump, being an engine driven pump, may remain active as long as the engine continues to operate. Further, since the DI pump continues to be active (without pressurizing fuel and pumping fuel to the direct injector fuel rail), lubrication of the DI pump may be desired. Accordingly, the lift pump may be operated for short durations (e.g., 0.25 second) to maintain pressure at the inlet of the DI pump. As such, the lift pump may be deactivated upon determining that the fuel fill in the gasoline tank is lower than T_Fill_2. However, if pressure at the inlet of the DI pump is estimated to be lower than a threshold pressure, the lift pump may be temporarily activated to pressurize the DI pump inlet (e.g., provide pressurized fuel into passage 979 of FIG. 9B). With reference to FIG. 9B, pressure at the inlet of the DI pump may be measured by pressure sensor 936. Once the lift pump is pulsed to increase pressure at the DI pump inlet (e.g., increased to higher than the threshold pressure), the lift pump may be deactivated while pressure in the passage 979 and at DI pump inlet is maintained as check valve 923 blocks fuel flow from DI pump 950 into lift pump 920. Thus, the DI pump continues to receive the second liquid fuel at a desired pressure promoting lubrication of the DI pump.

Next, at 1030, routine 1000 continues fueling the bi-fuel engine with the first gaseous fuel. Further still, at 1032, an amount of the first gaseous fuel delivered to the bi-fuel engine may be adjusted based on existing engine conditions. Next, at 1034, the operator is notified of low fuel levels in the gasoline tank. Routine 1000 then continues to 1044 of FIG. 10B.

Returning to 1038, if it is confirmed that the bi-fuel engine is not operating with both fuels at the same time, routine 1000 proceeds to 1038 to continue to 1040 in FIG. 10B. Next, at 1042, routine 1000 determines if the bi-fuel engine is combusting only gasoline (or the second liquid fuel). Specifically, the bi-fuel engine may be operating with gasoline alone and may not receive a supply of the first gaseous fuel. If no, routine 1000 proceeds to 1044 to determine that the bi-fuel engine is operating with the first gaseous fuel alone. Herein, the cylinders of the bi-fuel engine may be injected only with the first gaseous fuel. Further, in the example of bi-fuel engine 910 coupled to fuel system 918, the lift pump within the second fuel tank (e.g., gasoline tank) may be deactivated if the bi-fuel engine is fueled by the gaseous fuel alone. However, in the example of bi-fuel engine 915 coupled to fuel system 928, the DI pump 50 may be commanded to cease pressurizing the second liquid fuel to the pressure desired by the direct injectors. As such, direct injection of gasoline may not occur. Furthermore, the lift pump in fuel system 928 may be maintained operative to lubricate the DI pump 50 even though the bi-fuel engine 915 is primarily combusting the gaseous fuel.

Next, at 1046, routine 1000 determines if the fuel rail pressure (FRP) in the first fuel rail containing the first gaseous fuel rail is lower than a threshold level, T_G. The threshold level, T_G, may be based on a volume of the first fuel tank. As such, fuel rail pressure in the first fuel rail lower than the threshold level, T_G, may indicate that the first fuel tank is running out of the first gaseous fuel. If it is confirmed that the fuel rail pressure in the first fuel rail is higher than the threshold level, routine 1000 continues to 1048 to maintain operation of the bi-fuel engine with only gaseous fuel combustion. As such, engine operation with fueling of gaseous fuel alone may be maintained until engine conditions change. For example, engine conditions may change when the bi-fuel engine may be operated with gasoline alone.

However, if it is determined that the FRP in the first fuel rail is lower than the threshold level, T_G, routine 1000 progresses to 1050 to determine that an amount of gaseous amount available in the first fuel tank is low, e.g., substantially empty (e.g., 99% empty). As such, the first fuel tank may be considerably exhausted of the gaseous fuel.

Next, at 1052, routine 1000 discontinues fueling the bi-fuel engine with gaseous fuel and commences fueling the bi-fuel engine with gasoline alone. Fueling with the first gaseous fuel may be terminated as soon as FRP in the first fuel rail drops below threshold level, T_G. Herein, in response to determining that the gaseous fuel tank is depleted of gaseous fuel, operation of the bi-fuel engine may be transitioned from combusting gaseous fuel alone to that of combusting gasoline alone. Accordingly, at 1054, if the bi-fuel engine receives gasoline via port injection (e.g., bi-fuel engine 910 of FIG. 9A), the lift pump may be activated to pump gasoline to the corresponding port injectors. Herein, the lift pump may receive electrical power for actuation. Alternatively, if the bi-fuel engine receives gasoline via direct injection, as in bi-fuel engine 915 of FIG. 9B, the DI pump may be commanded to begin pressurizing gasoline to a desired fuel rail pressure based on existing engine conditions. Herein, the lift pump may be maintained active throughout while the operation of the DI pump may be varied based on whether the bi-fuel engine is combusting gasoline or not.

Routine 1000 then proceeds to 1056 which will be described below. Returning to 1042, if it is confirmed that the bi-fuel engine is combusting gasoline alone, routine 1000 continues to 1056 to determine that the bi-fuel engine is now operating on gasoline alone. Accordingly, supply of the first gaseous fuel into the engine may be discontinued. Further, at 1058, gaseous fuel may not be delivered into the bi-fuel engine. Next, at 1060, routine 1000 confirms if the fuel fill in the gasoline tank is lower than the fill threshold. For example, if the bi-fuel engine is port injected with gasoline (e.g., bi-fuel engine 910 of FIG. 9A), it may be determined at 1060 if the fuel fill within the gasoline tank is lower than T_Fill_1. On the other hand, if the bi-fuel engine receives gasoline as a direct injection (e.g., bi-fuel engine 915 of FIG. 9B) it may be determined at 1060 if the fuel fill within the gasoline tank is lower than T_Fill_2.

If it is determined at 1060 that fuel fill within the second fuel tank is higher than the fill threshold, engine operation and fuel system operation is continued at 1070. As such, the lift pump may remain actuated (via receiving electrical power) to pump liquid fuel into the port injector or to the DI pump. Further, when the DI pump is present, the second liquid fuel may be injected via direct injectors into the bi-fuel engine as desired by existing engine conditions. Routine 1000 then ends.

However, if the fuel fill in the gasoline tank is lower than the fill threshold, routine 1000 continues to 1062 to notify the operator of the vehicle (e.g., if the operator has not been previously notified) of low fuel levels within the gasoline tank. If the gaseous fuel tank has been depleted previously (e.g., at 1050), the operator may be notified that the gaseous fuel tank is empty. Next, at 1064, operation of the bi-fuel engine may be maintained until the second fuel tank is empty. Herein, the lift pump may continue to operate and pump fuel until the first fuel tank is drained of liquid fuel. Further, as the fuel tank is emptied, the lift pump may draw fuel vapor. In response to receiving fuel vapor, the engine may stall and shut down. Concurrently, electrical power to the lift pump may be ceased deactivating the lift pump, and the DI pump (when present) may be stopped as the engine ceases rotating.

In an optional case wherein the gaseous fuel tank still contains gaseous fuel, engine operation may be transitioned at 1066 to combust gaseous fuel alone. Further, as at 1014, for a port injected bi-fuel engine, the lift pump may be disabled. If the bi-fuel engine receives direct injection of gasoline, gasoline injection via direct injector into the bi-fuel engine may be terminated as at 1024. Further, the bi-fuel engine may operate with gaseous fuel until the gaseous fuel tank is empty. Once the gaseous fuel tank is drained, engine operation may be transitioned to that with gasoline alone and engine operation may continue until the second fuel tank is depleted, unless a refueling event occurs. Routine 1000 then ends.

Optionally at 1068, if a refueling event is confirmed (either before or after the gasoline tank is empty), the deactivated lift pump in the second fuel tank (e.g., gasoline tank) of fuel system 918 may be re-activated. The deactivated lift pump may be reactivated in response to the refueling event following a key-off condition. The refueling event may be established, in one example, by an increase in fuel levels in the second fuel tank. Specifically, the refueling event may be confirmed if fuel fill in the second fuel tank (e.g., gasoline tank) rises to higher than the fill threshold, T_Fill_1 in fuel system 918. In the example of engine 915 which receives gasoline in the form of direct injections, the refueling event may be confirmed by fuel fill in the second fuel tank (e.g., gasoline tank) increasing to higher than the fill threshold, T_Fill_2. In response to the confirmation of the refueling event in engine system 970, direct injection of gasoline to bi-fuel engine 915 may be resumed. Herein, the DI pump may be commanded to pressurize the second liquid fuel received from the lift pump to a higher pressure. In another example, the refueling event may be validated when the operator unlocks a refueling lock. Routine 1000 then ends.

It will be appreciated that the controller in the bi-fuel engine embodiment of FIG. 9A (port injected gasoline) may not perform 1020, 1024, and 1026 of routine 1000. Likewise, if the bi-fuel engine is the example embodiment of FIG. 9B (including a DI pump with direct injection of gasoline), a controller may not perform 1008, 1012, 1014, and 1016 of routine 1000.

Thus, in one example, a method for a bi-fuel engine may comprise, while fueling the bi-fuel engine with each of a first gaseous fuel and a second liquid fuel, operating a lift pump to pump the second liquid fuel, and responsive to a fill level of the second liquid fuel lower than a fill threshold, disabling the lift pump, and ceasing pumping the second liquid fuel into the bi-fuel engine. In the preceding example, the second liquid fuel may additionally or optionally be port injected into the bi-fuel engine. In any or all of the preceding examples, the method may additionally or optionally further include continuing to fuel the bi-fuel engine with the first gaseous fuel (after deactivating the lift pump). In any or all of the preceding examples, the second liquid fuel may additionally or optionally be direct injected into the bi-fuel engine. In any or all of the preceding examples, the lift pump may additionally or optionally supply fuel to a direct injection pump with the direct injection pump delivering fuel to at least one direct injector. In any or all of the preceding examples, the method may additionally or optionally comprise, while ceasing pumping the second liquid fuel into the bi-fuel engine, operating the lift pump intermittently to lubricate the direct injection pump. In any or all of the preceding examples, the method may additionally or optionally include activating the lift pump in response to detection of a refueling event, the refueling event comprising an increase in the fill level of the second liquid fuel to higher than the fill threshold.

In this way, a lift pump in a bi-fuel engine may be protected from degradation due to fuel starvation when the bi-fuel engine is combusting both fuels concurrently. By deactivating the lift pump alone when fuel levels of the second liquid fuel are lower than a fill threshold, bi-fuel engine operation may continue with gaseous fuel alone. In the case of a direct injected bi-fuel engine, lift pump operation may be maintained only for lubrication of the DI pump. Accordingly, fuel levels within the gasoline tank may not reduce further while engine operation is continued via combustion of the gaseous (or alternative) fuel. In the case of an engine fueled by a single fuel via a fuel system that includes two lift pumps, one of the two lift pumps may be deactivated upon detecting low fuel fills in the fuel tank. A technical effect of disabling one of the two lift pumps is that both lift pumps may be protected from degradation due to the fuel in the fuel tank being depleted. By maintaining a single lift pump activated, engine operation may continue and when the fuel tank is drained of fuel, the engine may stall and terminate electrical supply to the single active lift pump. Thus, drivability may be maintained while reducing lift pump degradation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system in a vehicle, comprising:
   supplying fuel from a common reservoir via each of a first lift pump and a second lift pump where fuel fill in the common reservoir is lower than a fuel fill threshold, and a fuel depth at each lift pump is different; and
   responsive to fuel fill in the common reservoir being lower than the fuel fill threshold, and the fuel depth at each lift pump being different:
      disabling the lift pump at which the fuel depth is lower; and
      supplying fuel only via the non-disabled lift pump, wherein the fuel depth at each of the lift pumps is inferred based on a current draw of each of the first lift pump and the second lift pump, wherein the lift pump with a lower current draw is the lift pump at which the fuel depth is lower.

2. The method of claim 1, further comprising, if an output pressure of the non-disabled lift pump is lower than an output pressure threshold, deactivating the non-disabled lift pump.

3. The method of claim 1, wherein fuel supplied from the common reservoir via each of the first lift pump and the second lift pump is pumped to an inlet of a direct injection pump.

4. The method of claim 3, wherein the direct injection pump further supplies fuel to one or more direct injectors, each of the direct injectors fueling at least one cylinder of an engine.

5. The method of claim 4, further comprising, responsive to a pressure at the inlet of the direct injection pump being lower than a pressure threshold, deactivating the non-disabled lift pump, and ceasing supplying fuel to the direct injection pump.

6. The method of claim 1, further comprising adjusting a transmission shift schedule in response to disabling one of the first lift pump and the second lift pump.

7. The method of claim 1, wherein the common reservoir is situated inside a fuel tank, and wherein the common reservoir is filled with fuel from the fuel tank via one or more jet pumps.

8. The method of claim 1, wherein the lift pump at which the fuel depth is lower depends on whether the vehicle is turning in a specific direction, and if the vehicle is turning in the specific direction, the lift pump in the turn that comprises a smaller turn radius is the lift pump at which the fuel depth is lower and is the lift pump that is disabled.

9. The method of claim 1, wherein the lift pump at which the fuel depth is lower depends on whether the vehicle is traveling on an incline, and if the vehicle is traveling on an incline, the lift pump that is positioned higher with respect to gravity is the lift pump at which the fuel depth is lower and is the lift pump that is disabled.

10. A vehicle system, comprising:
   an engine;
   a transmission;
   a fuel tank comprising a reservoir, the reservoir situated within a compartment of the fuel tank;
   a fuel level sensor in the reservoir measuring a fuel level within the reservoir;
   a first lift pump and a second lift pump positioned within the reservoir, each of the first lift pump and the second lift pump being electrically actuated, and each of the first lift pump and the second lift pump pumping fuel from the reservoir;
   a direct injection pump receiving fuel from each of the first lift pump and the second lift pump; and
   a controller with computer readable instructions stored in non-transitory memory for:
      during a first condition,
         deactivating each of the first lift pump and the second lift pump concurrently; and
         terminating fuel supply to the direct injection pump;
      during a second condition,
         deactivating the first lift pump; and
         continuing fuel supply to the direct injection pump; and
      during another condition, disabling one of the first lift pump and the second lift pump whenever a current draw of that lift pump decreases below a threshold.

11. The vehicle system of claim 10, wherein the first condition includes an engine shut down, the engine shut down to rest, and wherein the second condition includes a fuel fill level in the reservoir being lower than a fill threshold and the engine not being shut down and fuel depths at each lift pump being different.

12. The vehicle system of claim 10, wherein the controller includes further instructions for, during the second condition, maintaining the second lift pump activated to continue fuel supply to the direct injection pump or wherein the controller includes further instructions for, during the second condition, adjusting a transmission shift schedule in response to deactivating the first lift pump.

13. The method of claim 1, further comprising, responsive to refueling of the common reservoir, activating the disabled lift pump.

14. A method for a fuel system in a vehicle, comprising:
supplying fuel from a common reservoir via each of a first lift pump and a second lift pump where fuel fill in the common reservoir is lower than a fuel fill threshold, and a fuel depth at each lift pump is different;
responsive to fuel fill in the common reservoir being lower than the fuel fill threshold, and the fuel depth at each lift pump being different:
disabling the lift pump at which the fuel depth is lower; and
supplying fuel only via the non-disabled lift pump; and
disabling one of the first lift pump and the second lift pump whenever a current draw of that lift pump decreases below a threshold.

15. The vehicle system of claim 10, wherein both the first lift pump and the second lift pump are connected to the direct injection pump via a common passage.

* * * * *